(12) United States Patent
Kudo

(10) Patent No.: US 8,908,568 B2
(45) Date of Patent: Dec. 9, 2014

(54) COMMUNICATION SYSTEM AND COMPUTER PROGRAM PRODUCT

(75) Inventor: Yasuhiro Kudo, Ichinomiya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 921 days.

(21) Appl. No.: 12/974,734

(22) Filed: Dec. 21, 2010

(65) Prior Publication Data

US 2011/0158231 A1   Jun. 30, 2011

(30) Foreign Application Priority Data

Dec. 28, 2009   (JP) ................. 2009-296712

(51) Int. Cl.
  *H04L 12/16* (2006.01)
  *H04L 12/18* (2006.01)
  *H04L 29/08* (2006.01)
  *H04L 29/06* (2006.01)

(52) U.S. Cl.
  CPC ............ *H04L 67/141* (2013.01); *H04L 63/10* (2013.01); *H04L 12/1818* (2013.01)
  USPC ...... 370/260; 370/261; 379/202.01; 715/753; 709/204

(58) Field of Classification Search
  USPC ............... 370/389, 260–269; 709/204–207; 379/202.01–207.01; 715/753–758
  See application file for complete search history.

(56) References Cited

U.S. PATENT DOCUMENTS 6,781,964 B1   8/2004   Klaghofer
2008/0101564 A1   5/2008   Araki

FOREIGN PATENT DOCUMENTS

| JP | A-2004-133834 | 4/2004 |
|---|---|---|
| JP | A-2006-5526 | 1/2006 |
| JP | A-2008-113381 | 5/2008 |
| JP | A-2008-288974 | 11/2008 |

OTHER PUBLICATIONS

Office Action issued in Japanese Patent Application No. 2009-296712 mailed Apr. 30, 2013 (with translation).

*Primary Examiner* — Dang Ton
*Assistant Examiner* — Mandish Randhawa
(74) *Attorney, Agent, or Firm* — Oliff PLC

(57) ABSTRACT

A communication system includes a first communication terminal, a second communication terminal that has not established communication with the first communication terminal, and a third communication terminal that has established communication with the first communication terminal. The second communication terminal transmits to the first communication terminal a request packet that requests establishment of communication, and receives from the first communication terminal a permission packet that permits establishment of communication. The second communication terminal then establishes communication with the first communication terminal and performs communication with the first communication terminal. A second receiving device receives the request packet from the third communication terminal, after the first receiving device has received the permission packet from the first communication terminal; The second communication terminal transmits the permission packet to the third communication terminal, and establishes communication with the third communication terminal and performs communication with the third communication terminal.

16 Claims, 19 Drawing Sheets

COMMUNICATION SYSTEM AND COMPUTER PROGRAM PRODUCT

CROSS-REFERENCE TO RELATED APPLICATION

This application claims priority to Japanese Patent Application No. 2009-296712, filed Dec. 28, 2009, the disclosure of which is hereby incorporated by reference in its entirety.

BACKGROUND

The present disclosure relates to a communication system in which communication is performed between a communication terminal and another communication terminal, and to a computer program product for a communication terminal.

A communication method that achieves multipoint communication is defined and used in a communication system such as a video conferencing system. For example, in H.243, H.230 and H.231 recommended by the International Telecommunication Union-Telecommunication Standardization Sector (ITU-T), a particular one of terminals participating in a video conference is defined as a parent terminal. The parent terminal generates video and audio and transmits them to a child terminal that is another terminal participating in the video conference. The child terminal outputs the video and audio received from the parent terminal. By recognizing the video and audio, a terminal user can have a remote conference with another terminal user.

Further, for example, in order to reduce communication delay that occurs due to concentration of video and audio on the parent terminal, a technology is also known in which communication of video and audio can be performed directly between child terminals.

SUMMARY

With the above-described known technology, the parent terminal needs to perform communication to establish communication with the child terminals, and to thereby establish communication between the child terminals. For this reason, it is necessary to determine one of the terminals in the communication system as a parent terminal. If the parent terminal is determined, a system user needs to notify the child terminals of the existence of the parent terminal. Further, if a series of communications, such as a video conference, is performed between the terminals, the parent terminal must continuously participate in the communication until the series of communications ends.

Various exemplary embodiments of the broad principles derived herein provide a communication system that is capable of establishing communication between child terminals without determining a parent terminal, and a computer program product for a communication terminal.

Exemplary embodiments provide a communication system includes a first communication terminal that is connectable to a network, a second communication terminal that is connectable to the network and that has not established communication with the first communication terminal, and a third communication terminal that is connectable to the network and that has established communication with the first communication terminal. The second communication terminal includes a first transmitting device that transmits to the first communication terminal a request packet that requests establishment of communication, a first receiving device that, after the first transmitting device has transmitted the request packet, receives from the first communication terminal a permission packet that permits establishment of communication, a first communication device that, in a case where the first receiving device has received the permission packet from the first communication terminal, establishes communication with the first communication terminal and performs communication with the first communication terminal, a second receiving device that receives the request packet from the third communication terminal, after the first receiving device has received the permission packet from the first communication terminal, a second transmitting device that transmits the permission packet to the third communication terminal in a case where the second receiving device has received the request packet from the third communication terminal, and a second communication device that, after the second transmitting device has transmitted the permission packet to the third communication terminal, establishes communication with the third communication terminal and performs communication with the third communication terminal. The first communication terminal includes a third receiving device that receives the request packet from the second communication terminal, a third transmitting device that transmits the permission packet to the second communication terminal in a case where the third receiving device has received the request packet from the second communication terminal, a third communication device that, after the third transmitting device has transmitted the permission packet to the second communication terminal, establishes communication with the second communication terminal and performs communication with the second communication terminal, and a fourth transmitting device that, in a case where the third transmitting device has transmitted the permission packet to the second communication terminal, transmits to the third communication terminal a notification packet that notifies that establishment of communication with the second communication terminal is permitted. The third communication terminal includes a fourth receiving device that receives the notification packet transmitted from the first communication terminal, a fifth transmitting device that transmits the request packet to the second communication terminal in a case where the fourth receiving device has received the notification packet from the first communication terminal, a fifth receiving device that receives the permission packet from the second communication terminal, after the fifth transmitting device has transmitted the request packet to the second communication terminal, and a fourth communication device that, in a case where the fifth receiving device has received the permission packet from the second communication terminal, establishes communication with the second communication terminal and performs communication with the second communication terminal.

Exemplary embodiments also provide a communication system includes a first communication terminal that is connectable to a network, a second communication terminal that is connectable to the network and that has not established communication with the first communication terminal, and a third communication terminal that is connectable to the net-work and that has established communication with the first communication terminal. The first communication terminal includes a first transmitting device that transmits to the second communication terminal a request packet that requests establishment of communication, a first receiving device that, after the first transmitting device has transmitted the request packet, receives from the second communication terminal a permission packet that permits establishment of communication, a first communication device that, in a case where the first receiving device has received the permission packet from the second communication terminal, establishes communication with the second communication terminal and performs communication with the second communication terminal, and a second transmitting device that, after the first receiving device has received the permission packet from the second communication terminal, transmits to the third communication terminal a notification packet that notifies that establishment of communication with the second communication terminal is permitted. The second communication terminal includes a second receiving device that receives the request packet from the first communication terminal, a third transmitting device that transmits the permission packet to the first communication terminal in a case where the second receiving device has received the request packet from the first communication terminal, a second communication device that, after the third transmitting device has transmitted the permission packet to the first communication terminal, establishes communication with the first communication terminal and performs communication with the first communication terminal, a third receiving device that receives the request packet from the third communication terminal, after the third transmitting device has transmitted the permission packet to the first communication terminal, a fourth transmitting device that transmits the permission packet to the third communication terminal in a case where the third receiving device has received the request packet from the third communication terminal, and a third communication device that, after the fourth transmitting device has transmitted the permission packet to the third communication terminal, establishes communication with the third communication terminal and performs communication with the third communication terminal. The third communication terminal includes a fourth receiving device that receives the notification packet transmitted from the first communication terminal, a fifth transmitting device that transmits the request packet to the second communication terminal in a case where the fourth receiving device has received the notification packet from the first communication terminal, a fifth receiving device that receives the permission packet from the second communication terminal, after the fifth transmitting device has transmitted the request packet to the second communication terminal, and a fourth communication device that, in a case where the fifth receiving device has received the permission packet from the second communication terminal, establishes communication with the second communication terminal and performs communication with the second communication terminal.

Exemplary embodiments further provide a computer program product stored on a non-transitory computer-readable medium, comprising instructions for causing a computer of a communication terminal that is connectable to a network to perform the steps of transmitting to a first communication terminal a request packet that requests establishment of communication, the first communication terminal being another communication terminal with which the communication terminal has not established communication, receiving from the first communication terminal a permission packet that permits establishment of communication, after the request packet has been transmitted establishing communication with the first communication terminal and performing communication with the first communication terminal in a case where the permission packet has been received from the first communication terminal, receiving, after the permission packet has been received from the first communication terminal, in a case where there is a second communication terminal that is still another communication terminal that has established communication with the first communication terminal, the request packet transmitted from the second communication terminal, the first communication terminal transmitting to the second communication terminal a notification packet that notifies that establishment of communication with the communication terminal is permitted, after the first communication terminal has established communication with the communication terminal, and the second communication terminal transmitting the request packet to the communication terminal in a case where the second communication terminal has received the notification packet from the first communication terminal, transmitting the permission packet to the second communication terminal in a case where the request packet has been received from the second communication terminal, establishing communication with the second communication terminal and performing communication with the second communication terminal, after the permission packet has been transmitted to the second communication terminal, and transmitting, after the permission packet has been received from the first communication terminal, in a case where there is a second terminal communication and a third communication terminal that is another of the communication terminals other than the first communication terminal and with which communication has been established, the notification packet that notifies that communication with the first communication terminal is permitted to the third communication terminal, the third communication terminal transmitting the request packet to the first communication terminal in a case where the third communication terminal has received the notification packet, the first communication terminal sending back the permission packet to the third communication terminal, and the first communication terminal and the third communication terminal establishing communication.

BRIEF DESCRIPTION OF THE DRAWINGS

Exemplary embodiments will be described below in detail with reference to the accompanying drawings in which.

DETAILED DESCRIPTION OF THE EXEMPLARY EMBODIMENTS

Figure 1:
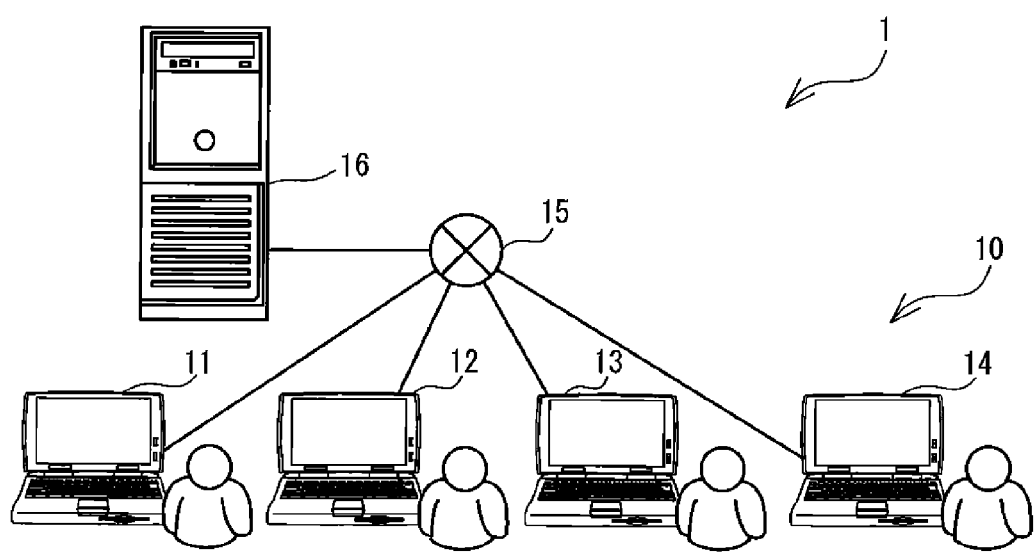
FIG. 1 is a schematic diagram showing a communication system 1.

Hereinafter, a communication system 1 according to the present disclosure will be explained with reference to the drawings. The drawings are used to explain technical features that the present disclosure can adopt. A device configuration, flowcharts of various types of processing, and the like that are shown in the drawings are simply explanatory examples and do not limit the present disclosure to only those examples.

An overview of the communication system 1 will be explained with reference to FIG. 1. The communication system 1 includes communication terminals 11, 12, 13 and 14. Hereinafter, when the communication terminals 11, 12, 13 and 14 are collectively referred to or when there is no need to distinguish between them, they are referred to as a "communication terminal 10" or "communication terminals 10". The communication terminals 10 are each connectable to a network 15. The communication terminals 10 can perform communication with each other via the network 15. The communication terminal 10 may perform communication with another one of the communication terminals 10 based on a predetermined procedure. In a case where communication based on the predetermined procedure succeeds, the communication terminal 10 becomes able to perform Peer to Peer (P2P) communication with the other one of the communication terminals 10. Hereinafter, reaching a state in which P2P communication is able to be performed is referred to as "communication is established". The communication terminal 10 can establish communication with another one of the communication terminals 10 without determining one of the communication terminals 10 as a parent terminal. After communication has been established, communication of data (captured video data, audio data etc.) to conduct a video conference, for example, may be performed between the communication terminals 10. The communication terminal 10 can output the captured video data and the audio data received from another one of the communication terminals 10. A user who uses the communication terminal 10 can recognize captured video and audio of a user who uses another one of the communication terminals 10. Note that the communication system 1 may be provided with a session initiation protocol (SIP) server 16. The SIP server 16 may perform call control between the communication terminals 10 using an SIP, if necessary.

Figure 2:
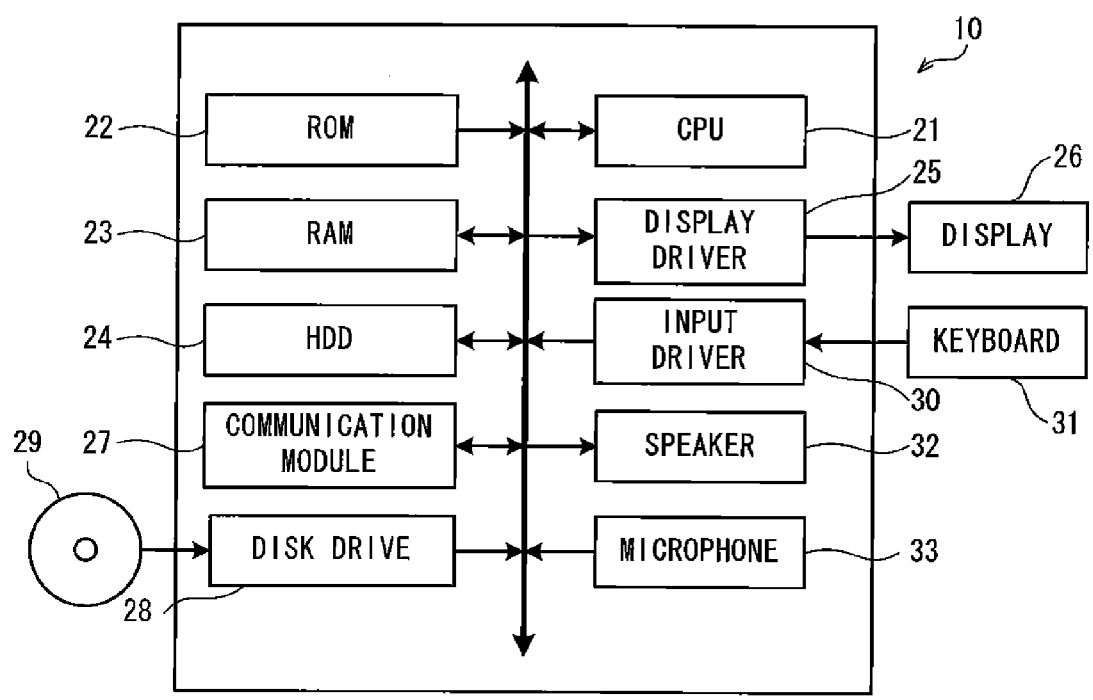
FIG. 2 is a block diagram showing an electrical configuration of a communication terminal 10.
Figure 3:
FIG. 3 is a schematic diagram showing an establishment state table 211.

An electrical configuration of the communication terminal 10 will be explained with reference to FIG. 2. The communication terminal 10 includes a CPU 21, a ROM 22, a RAM 23 and an HDD 24. The CPU 21 controls communication with another one of the communication terminals 10. At least a boot program and default parameters are stored in the ROM 22. At least temporary data that is generated in a case where the CPU 21 performs processing is stored in the RAM 23. At least a program of the CPU 21 and various types of tables (refer to FIG. 3 and FIG. 4) are stored in the HDD 24. The CPU 21 is electrically connected to the ROM 22, the RAM 23 and the HDD 24. The CPU 21 can access storage areas of the ROM 22, the RAM 23 and the HDD 24.

The communication terminal 10 is provided with a display driver 25. The display driver 25 performs control to display an image on a display 26. The CPU 21 is electrically connected to the display driver 25. The display driver 25 is electrically connected to the display 26. The CPU 21 can display a desired image on the display 26. The communication terminal 10 is provided with an input deriver 30. The input driver 30 detects information input via a keyboard 31. The CPU 21 is electrically connected to the input driver 30. The input driver 30 is electrically connected to the keyboard 31. The CPU 21 can recognize information input via the keyboard 31. The communication terminal 10 is provided with a speaker 32. The CPU 21 is electrically connected to the speaker 32. The CPU 21 can output desired audio from the speaker 32. The communication terminal 10 is provided with a microphone 33. The CPU 21 is electrically connected to the microphone 33. The CPU 21 can acquire audio input via the microphone 33.

The communication terminal 10 is provided with a communication module 27. The communication module 27 enables communication via the network 15. The CPU 21 is electrically connected to the communication module 27. The CPU 21 can perform communication via the network 15. The communication terminal 10 is provided with a disk drive 28. The disk drive 28 is a drive unit to access information stored in a storage medium 29. The CPU 21 is electrically connected to the disk drive 28. In a state where the storage medium 29 is inserted in the disk drive 28, the CPU 21 can access the information stored in the storage medium 29. For example, a communication program executed by the CPU 21 is stored in the storage medium 29. When the communication terminal 10 connects to the communication system 1, the communication program is read out from the storage medium 29 and stored in the HDD 24.

Tables stored in the HDD 24 will be explained below. An establishment state table 211 that is an example of an establishment state table will be explained with reference to FIG. 3. A communication terminal ID and a communication state of each of the communication terminals 10 are associated with each other and stored in the establishment state table 211. The communication terminal 10 uses three states to manage communication states with the other communication terminals 10. When the communication terminal 10 requests another one of the communication terminals 10 to establish communication, the communication state is "during request transmission". When the communication terminal 10 receives a request to establish communication from another one of the communication terminals 10, the communication state is "during request reception". When mutual communication with another one of the communication terminals 10 is possible, the communication state is "during communication".

Figure 4:
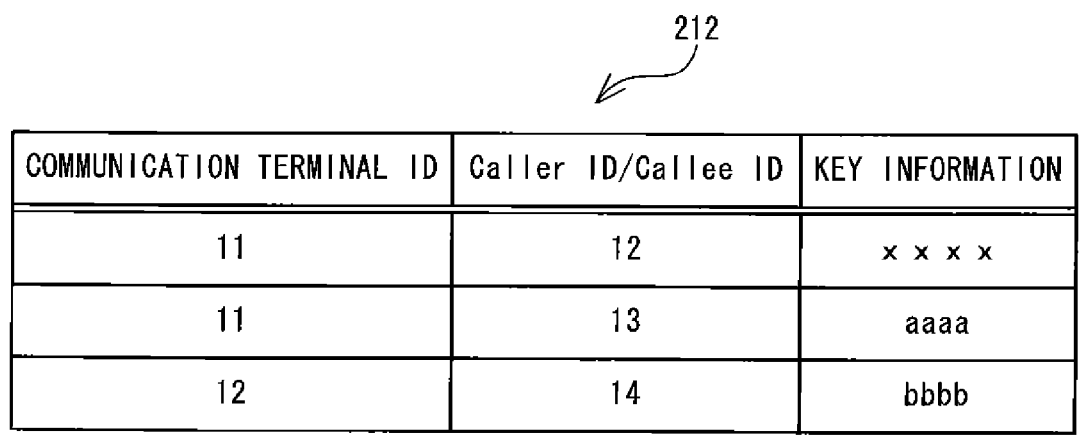
FIG. 4 is a schematic diagram showing a key information table 212.

A key information table 212 that is an example of a key information table will be explained with reference to FIG. 4. A communication terminal ID, a Caller ID/Callee ID and key information are associated with each other and stored in the key information table 212. The communication terminal ID is an ID of the communication terminal 10 that has determined key information (which will be described in detail later). The Caller ID/Callee ID is an ID of the communication terminal 10 that has established communication with the communication terminal 10 identified by the communication terminal ID.

Figure 5:
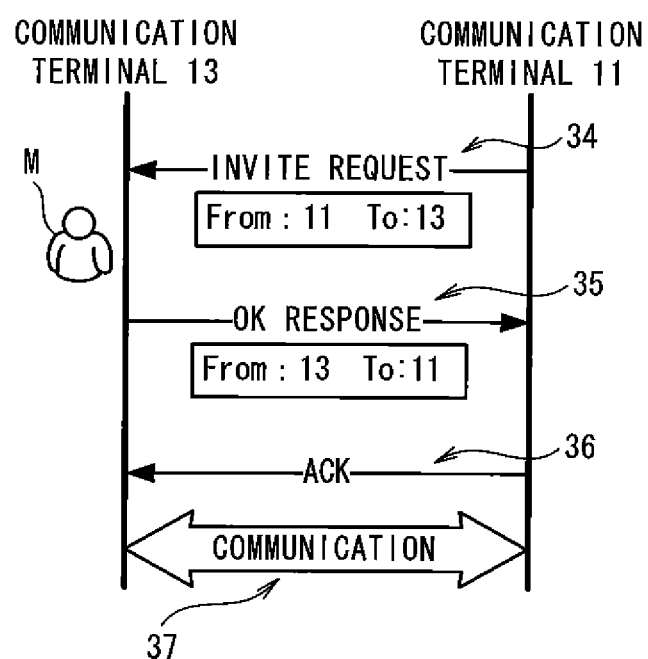
FIG. 5 is a diagram showing a communication sequence.

A communication procedure until communication is established between the communication terminal 11 and the communication terminal 13 and P2P communication is thereby performed will be explained with reference to FIG. 5. A user of the communication terminal 11 inputs, to the communication terminal 11, a command to establish communication with the communication terminal 13 and start P2P communication. The communication terminal 11 transmits to the communication terminal 13 a request packet that requests establishment of communication with another communication terminal. Hereinafter, the request packet that requests establishment of communication with another communication terminal is referred to as an "INVITE request". The communication terminal 13 receives the INVITE request (34). In the establishment state table of the communication terminal 11 that has transmitted the INVITE request, an ID "13" of the communication terminal 13 is stored as the communication terminal ID, and "during request transmission" is stored as the communication state. In the establishment state table of the communication terminal 13 that has received the INVITE request, an ID "11" of the communication terminal 11 is stored as the communication terminal ID, and "during request reception" is stored as the communication state.

The communication terminal 13 displays, on the display 26 of the communication terminal 13, information indicating that a request to establish communication has been transmitted from the communication terminal 11. A user of the communication terminal 13 determines whether or not to permit establishment of communication with the communication terminal 11. The user of the communication terminal 13 inputs a determination result to the communication terminal 13. A person icon M shown in FIG. 5 indicates a time zone in which the user can input a determination result to the communication terminal 13. The person icon M in the drawings indicates that the user can input a determination result within a predetermined time period after receiving a packet, such as the INVITE request (34) shown in FIG. 5. In a case where a determination result indicating permission of establishment of communication with the communication terminal 11 is input, the communication terminal 13 transmits to the communication terminal 11 a permission packet that permits establishment of communication with the communication terminal 13. Hereinafter, a permission packet that is transmitted in response to the INVITE request and that permits establishment of communication is referred to as an "OK response". The communication terminal 11 receives the OK response (35). The communication terminal 11 transmits an acknowledgment (ACK) to the communication terminal 13. The communication terminal 13 receives the ACK (36). In the establishment state table of the communication terminal 11 that has received the OK response, "during communication" is stored as a communication state that corresponds to the communication terminal ID "13". In the establishment state table of the communication terminal 13 that has received the ACK, "during communication" is stored as a communication state that corresponds to the communication terminal ID "11". By carrying out the above-described series of communication, communications between the communication terminal 11 and the communication terminal 13 is established. Thus, P2P communication is performed between the communication terminal 11 and the communication terminal 13 (37).

Figure 6:
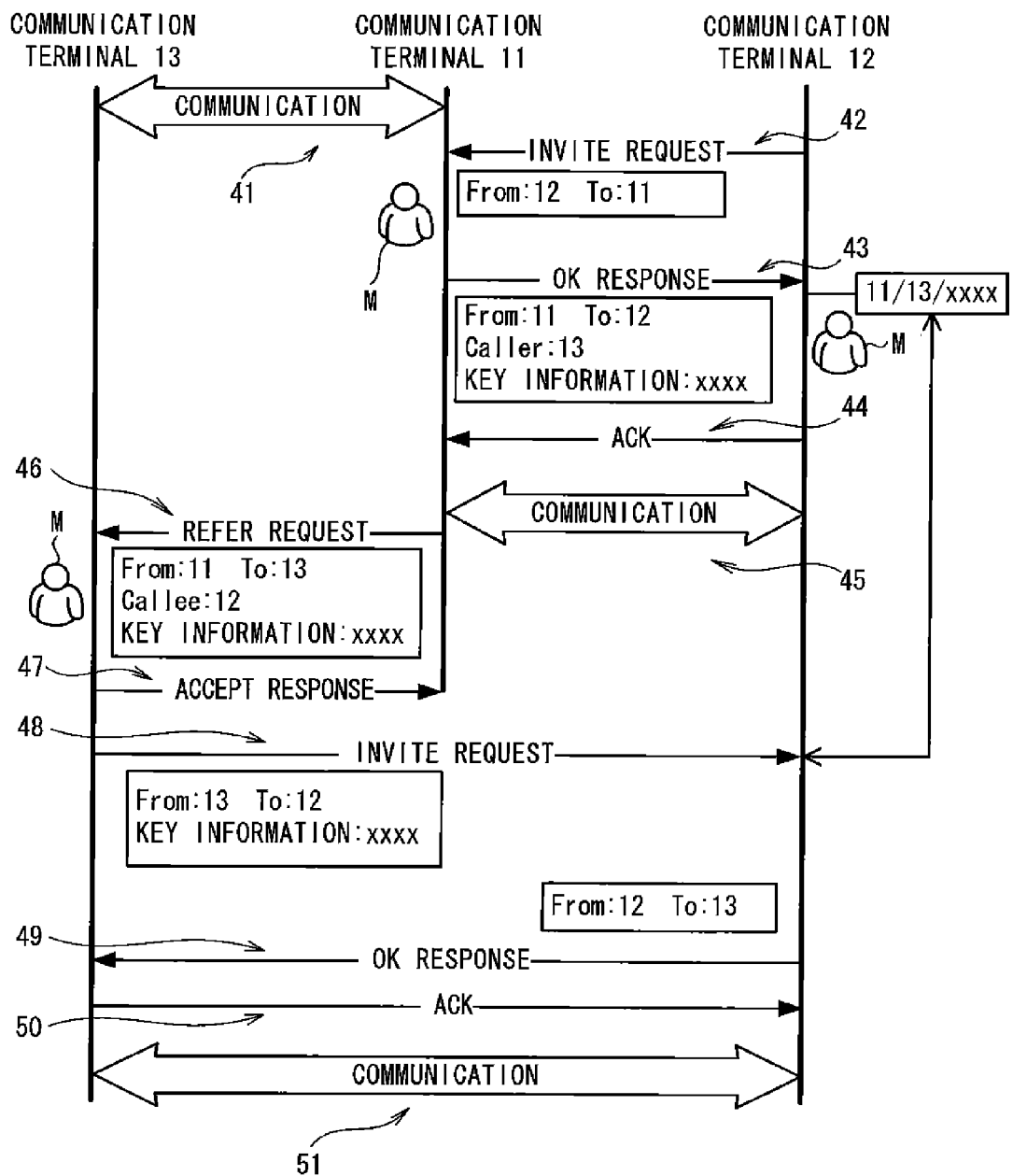
FIG. 6 is a diagram showing a communication sequence.

A first example of a communication procedure until communication is established between the communication terminals 11, 12 and 13 and P2P communication is thereby performed will be explained with reference to FIG. 6. Communication has already been established between the communication terminal 11 and the communication terminal 13. The communication terminal 11 and the communication terminal 13 are performing P2P communication (41). The first example shows a communication sequence until the communication terminal 12 establishes communication with the communication terminals 11 and 13 and thereby performs P2P communication.

A user of the communication terminal 12 inputs, to the communication terminal 12, a command to establish communication with the communication terminal 11 and start P2P communication. The communication terminal 12 transmits an INVITE request to the communication terminal 11. The communication terminal 11 receives the INVITE request (42). The establishment state tables of the communication terminal 11 and the communication terminal 12 are updated (for the establishment state table of the communication terminal 11, the communication terminal ID is "12" and the communication state is "during request reception"; for the establishment state table of the communication terminal 12, the communication terminal ID is "11" and the communication state is "during request transmission"). Information indicating that a request to establish communication has been transmitted from the communication terminal 12 is displayed on the display 26 of the communication terminal 11. The user of the communication terminal 11 determines whether or not to permit establishment of communication with the communication terminal 12. The user of the communication terminal 11 inputs a determination result to the communication terminal 11.

In a case where a determination result indicating permission of establishment of communication with the communication terminal 12 is input, the communication terminal 11 determines key information "xxxx". For example, the communication terminal 12 may generate random numbers based on a known algorithm and determine the generated random numbers as the key information. The communication terminal 11 transmits an OK response to the communication terminal 12. The OK response is associated with the determined key information "xxxx". Further, as the "Caller ID", the ID "13" of the communication terminal 13 that has established communication with the communication terminal 11 is associated with the OK response. The communication terminal 12 receives the OK response (43). The communication terminal 12 stores, in the key information table, the ID "11" of the communication terminal 11 that has transmitted the OK response, and the Caller ID "13" and the key information "xxxx" that have been associated with the OK response. The numbers "11", "13" and "xxxx" shown as "11/13/xxxx" in FIG. 6 respectively indicate the communication terminal ID, the Caller ID and the key information stored in the key information table.

In a case where a determination result indicating rejection of establishment of communication with the communication terminal 12 is input by the user of the communication terminal 11, the communication terminal 11 transmits to the communication terminal 12 a rejection packet that rejects establishment of communication. Hereinafter, the rejection packet is referred to as a "BUSY response". The communication terminal 12 receives the BUSY response. The establishment state tables of the communication terminals 11 and 12 are updated. More specifically, the communication terminal ID and the communication state are deleted from the establishment state tables. Communication between the communication terminal 11 and the communication terminal 12 is not established. In this manner, when the user of the communication terminal 11 does not desire to establish communication with the communication terminal 12, the communication terminal 11 can reject establishment of communication with the communication terminal 12. Because the communication terminal 11 can perform P2P communication by establishing communication only with another communication terminal 10 with which the user desires to establish communication, confidentiality of the communication system 1 can be maintained.

In a case where the communication terminal 12 receives the OK response from the communication terminal 11, the communication terminal 12 displays on the display 26 information indicating that establishment of communication with the communication terminal 11 is permitted. Further the communication terminal 12 displays on the display 26 information indicating the communication terminal 13, which has already established communication with the communication terminal 11. The user of the communication terminal 12 determines whether or not to permit establishment of communication with the communication terminal 13. The user of the communication terminal 12 inputs a determination result to the communication terminal 12.

In a case where a determination result indicating permission of establishment of communication with the communication terminal 13 is input, the communication terminal 12 transmits an ACK to the communication terminal 11. The communication terminal 11 receives the ACK (44). Communication between the communication terminal 11 and the communication terminal 12 is established. The establishment state tables of the communication terminal 11 and the communication terminal 12 are updated (for the establishment state table of the communication terminal 11, the communication terminal ID is "12" and the communication state is "during communication"; for the establishment state table of the communication terminal 12, the communication terminal ID is "11" and the communication state is "during communication"). P2P communication is performed between the communication terminal 11 and the communication terminal 12 (45).

In a case where a determination result indicating rejection of establishment of communication with the communication terminal 13 is input by the user of the communication terminal 12, the communication terminal 12 transmits to the communication terminal 11 a stop packet that stops communication. Hereinafter, the stop packet is referred to as a "BYE request". The communication terminal 11 receives the BYE request. The establishment state tables of the communication terminals 11 and 12 are updated. More specifically, the communication terminal ID and the communication state are deleted from the establishment state tables. Communication between the communication terminal 11 and the communication terminal 12 is not established. In this manner, before establishing communication with the communication terminal 11, the communication terminal 12 can recognize the communication terminal 13 that has already established communication with the communication terminal 11. In a case where the user of the communication terminal 12 does not desire to establish communication with the communication terminal 13, the communication terminal 12 can reject establishment of communication with the communication terminal 13. Thus, confidentiality of the communication system 1 can be maintained.

After the communication terminal 11 has received the ACK from the communication terminal 12, the communication terminal 11 transmits to the communication terminal 13 a notification packet that notifies that establishment of communication with the communication terminal 13 is permitted. Hereinafter, the notification packet that is transmitted when communication with another one of the communication terminals 10 is established and that notifies that establishment of communication with the other one of the communication terminals 10 is permitted is referred to as a "REFER request". The key information "xxxx", which has been associated with the OK response transmitted from the communication terminal 11 to the communication terminal 12, is associated with the REFER request. Further, the ID "12" of the communication terminal 12 that has requested the communication terminal 11 to establish communication is associated with the REFER request as a "Callee ID". The communication terminal 13 receives the REFER request (46). The establishment state tables of the communication terminal 11 and the communication terminal 13 are updated (for the establishment state table of the communication terminal 11, the communication terminal ID is "13" and the communication state is "during request transmission"; for the establishment state table of the communication terminal 13, the communication terminal ID is "11" and the communication state is "during request reception").

The communication terminal 13 displays on the display 26 information indicating that the communication terminal 11 has permitted establishment of communication with the communication terminal 12. The user of the communication terminal 13 determines whether or not to permit establishment of communication with the communication terminal 12. The user of the communication terminal 13 inputs a determination result to the communication terminal 13. In a case where a determination result indicating permission of establishment of communication with the communication terminal 12 is input, the communication terminal 13 transmits to the communication terminal 11 a permission packet that permits establishment of communication. Hereinafter, the permission packet that is transmitted in response to the REFER request and that permits establishment of communication is referred to as an "ACCEPT response". The communication terminal 11 receives the ACCEPT response (47).

In a case where a determination result indicating rejection of establishment of communication with the communication terminal 12 is input by the user of the communication terminal 13, the communication terminal 13 transmits to the communication terminal 11 a BUSY response. The communication terminal 11 receives the BUSY response. The communication terminal ID and the communication state are deleted from the establishment state tables of the communication terminals 11 and 13. The communication terminal 11 transmits a BYE request to the communication terminal 12. The communication terminal 12 receives the BYE request. The communication terminal ID and the communication state are deleted from the establishment state tables of the communication terminals 11 and 12. Communication between the communication terminal 12 and the communication terminal 13 is not established. The communication that has been established between the communication terminal 11 and the communication terminal 12 is cancelled. In this manner, the communication terminal 13 can recognize the communication terminal 12 with which the communication terminal 11 has permitted establishment of communication. In a case where the user of the communication terminal 13 does not desire to establish communication with the communication terminal 12, the communication terminal 13 can reject establishment of communication with the communication terminal 12. Further, in a case where the communication terminal 13 rejects establishment of communication, the communication terminal 11 cancels the communication that has been established between the communication terminal 11 and the communication terminal 12. Thus, confidentiality of the communication system 1 can be maintained.

After the communication terminal 13 has transmitted the ACCEPT response to the communication terminal 11, the communication terminal 13 transmits an INVITE request to the communication terminal 12 in order to establish communication with the communication terminal 12. The key information "xxxx" associated with the received REFER request is associated with the INVITE request. The communication terminal 12 receives the INVITE request (48). The establishment state tables of the communication terminals 12 and 13 are updated (for the establishment state table of the communication terminal 12, the communication terminal ID is "13" and the communication state is "during request reception"; for the establishment state table of the communication terminal 13, the communication terminal ID is "12" and the communication state is "during request transmission").

The communication terminal 12 determines whether or not the ID "13" of the communication terminal 13 that has transmitted the received INVITE request matches the Caller ID stored in the key information table. Further, the communication terminal 12 determines whether or not the key information "xxxx" associated with the received INVITE request matches the key information stored in the key information table. If they match with each other, it means that the communication terminal 13 identified by the Caller ID has established communication with the communication terminal 11. In this case, the communication terminal 12 does not perform a display to inquire of the user whether or not to permit establishment of communication. Thus, the communication terminal 12 can immediately perform communication without requiring confirmation by the user.

The communication terminal 12 transmits an OK response to the communication terminal 13. The communication terminal 13 receives the OK response (49). The communication terminal 13 transmits an ACK to the communication terminal 12. The communication terminal 12 receives the ACK (50). Thus, communication between the communication terminal 12 and the communication terminal 13 is established. The establishment state tables of the communication terminals 12 and 13 are updated (for the establishment state table of the communication terminal 12, the communication terminal ID is "13" and the communication state is "during communication"; for the establishment state table of the communication terminal 13, the communication terminal ID is "12" and the communication state is "during communication"). P2P communication is performed between the communication terminal 12 and the communication terminal 13 (51). In this manner, by determining whether or not the ID and the key information provided from the communication terminal that has transmitted the INVITE request match with the Caller ID and the key information stored in the key information table, the communication terminal 12 can determine whether or not the communication terminal 13 that has transmitted the INVITE request is the communication terminal 13 that has established communication with the communication terminal 11. The communication terminal 12 can start P2P communication by reliably establishing communication with the communication terminal 13 that has established communication with the communication terminal 11 that has requested establishment of communication. The communication terminal 12 can inhibit communication from being established with an unspecified communication terminal 10 that has not established communication with the communication terminal 11. Accordingly, the communication terminal 12 can inhibit information from leaking to an unspecified communication terminal 10.

Figure 7:
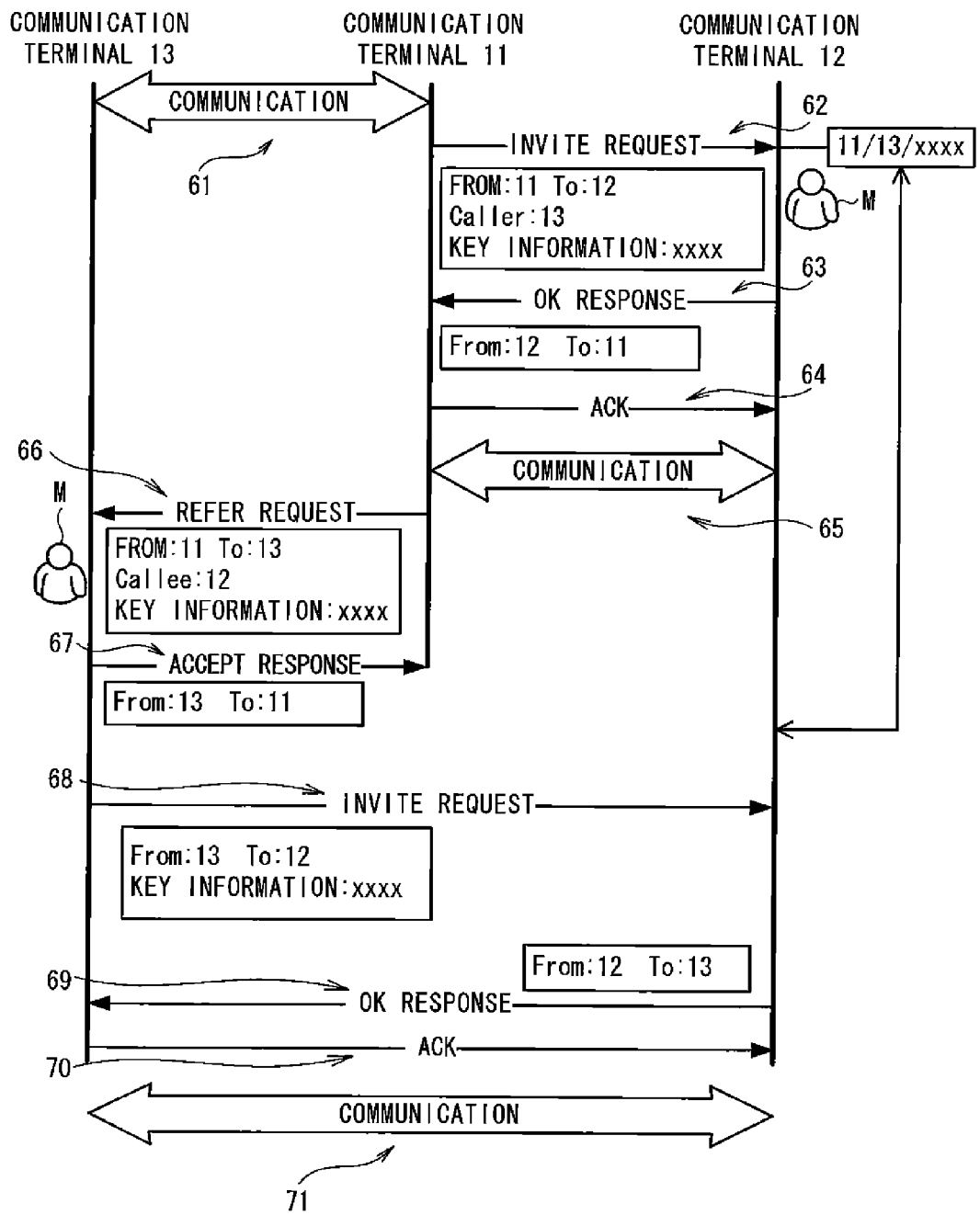
FIG. 7 is a diagram showing a communication sequence.

A second example of the communication procedure until communication is established between the communication terminals 11, 12 and 13 and P2P communication thereby becomes possible will be explained with reference to FIG. 7. The explanation is omitted or simplified for parts where the same processing as that in the above-described first example is performed. Communication has already been established between the communication terminal 11 and the communication terminal 13. The communication terminal 11 and the communication terminal 13 are performing P2P communication (61). The second example shows a communication sequence until the communication terminal 11 (of the communication terminal 11 and communication terminal 13 between which communication has been established) establishes communication with the communication terminal 12 and thereby performs P2P communication.

The user of the communication terminal 11 inputs, to the communication terminal 11, a command to establish communication with the communication terminal 12 and start P2P communication. The communication terminal 11 determines the key information "xxxx". The communication terminal 11 transmits an INVITE request to the communication terminal 12. The determined key information "xxxx" is associated with the INVITE request. Further, the ID "13" of the communication terminal 13 that has established communication with the communication terminal 11 is associated with the INVITE request as the "Caller ID". The communication terminal 12 receives the INVITE request (62). The communication terminal 12 stores, in the key information table, the ID "11" of the communication terminal 11 that has transmitted the INVITE request, and the Caller ID "13" and the key information "xxxx" that have been associated with INVITE request.

The communication terminal 12 displays on the display 26 information indicating that a request to establish communication has been transmitted from the communication terminal 11. Further, the communication terminal 12 displays on the display 26 information indicating the communication terminal 13, which has already established communication with the communication terminal 11. The user of the communication terminal 12 determines whether or not to permit establishment of communication with the communication terminals 11 and 13. The user of the communication terminal 12 inputs a determination result to the communication terminal 12. In a case where a determination result indicating permission of establishment of communication with the communication terminals 11 and 13 is input, the communication terminal 12 transmits an OK response to the communication terminal 11. The communication terminal 11 receives the OK response (63).

In a case where a determination result indicating rejection of establishment of communication with the communication terminals 11 and 13 is input by the user of the communication terminal 12, the communication terminal 12 transmits a BUSY response to the communication terminal 11. The communication terminal 11 receives the BUSY response. Communication between the communication terminals 11 and 13 and the communication terminal 12 is not established. In this manner, in a case where the user of the communication terminal 12 does not desire to establish communication with the communication terminals 11 and 13, the communication terminal 12 can reject establishment of communication with the communication terminals 11 and 13. Thus, confidentiality of the communication system 1 can be maintained.

In a case where the communication terminal 11 receives the OK response from the communication terminal 12, the communication terminal 11 transmits an ACK to the communication terminal 12. The communication terminal 12 receives the ACK (64). Communication between the communication terminal 11 and the communication terminal 12 is established. P2P communication is performed between the communication terminal 11 and the communication terminal 12 (65).

After the communication terminal 11 has transmitted the ACK to the communication terminal 12, the communication terminal 11 transmits a REFER request to the communication terminal 13. The key information "xxxx", which has been associated with the INVITE request transmitted to the communication terminal 12, is associated with the REFER request. Further, the ID "12" of the communication terminal 12 that is a destination of the transmitted INVITE request is associated with the REFER request as the "Callee ID". The communication terminal 13 receives the REFER request (66).

The communication terminal 13 inquires of the user whether or not to permit establishment of communication. In a case where information indicating permission of establishment of communication is input by the user of the communication terminal 13, the communication terminal 13 transmits an ACCEPT response to the communication terminal 11. The communication terminal 11 receives the ACCEPT response (67). After the communication terminal 13 has transmitted the ACCEPT response to the communication terminal 11, the communication terminal 13 transmits an INVITE request to the communication terminal 12 in order to establish communication with the communication terminal 12. The key information "xxxx", which has been associated with the received REFER request, is associated with the INVITE request. The communication terminal 12 receives the INVITE request (68). The communication terminal 12 determines whether or not the ID "13" of the communication terminal 13 that has transmitted the received INVITE request matches the Caller ID stored in the key information table. Further, the communication terminal 12 determines whether or not the key information "xxxx" associated with the received INVITE request matches the key information stored in the key information table. If they match with each other, it means that the communication terminal 13 identified by the Caller ID has established communication with the communication terminal 11. In this case, the communication terminal 12 does not perform a display to inquire of the user whether or not to permit establishment of communication. Thus, the communication terminal 12 can immediately perform communication without requiring confirmation by the user.

The communication terminal 12 transmits an OK response to the communication terminal 13. The communication terminal 13 receives the OK response (69). The communication terminal 13 transmits an ACK to the communication terminal 12. The communication terminal 12 receives the ACK (70). Communication between the communication terminal 12 and the communication terminal 13 is established. P2P communication is performed between the communication terminal 12 and the communication terminal 13 (71). In this manner, the communication terminal 12 can determine whether or not the communication terminal 13 that has transmitted the INVITE request is the communication terminal 13 that has established communication with the communication terminal 11. The communication terminal 12 can inhibit communication from being established with an unspecified communication terminal 10 that has not established communication with the communication terminal 11.

Figure 8:
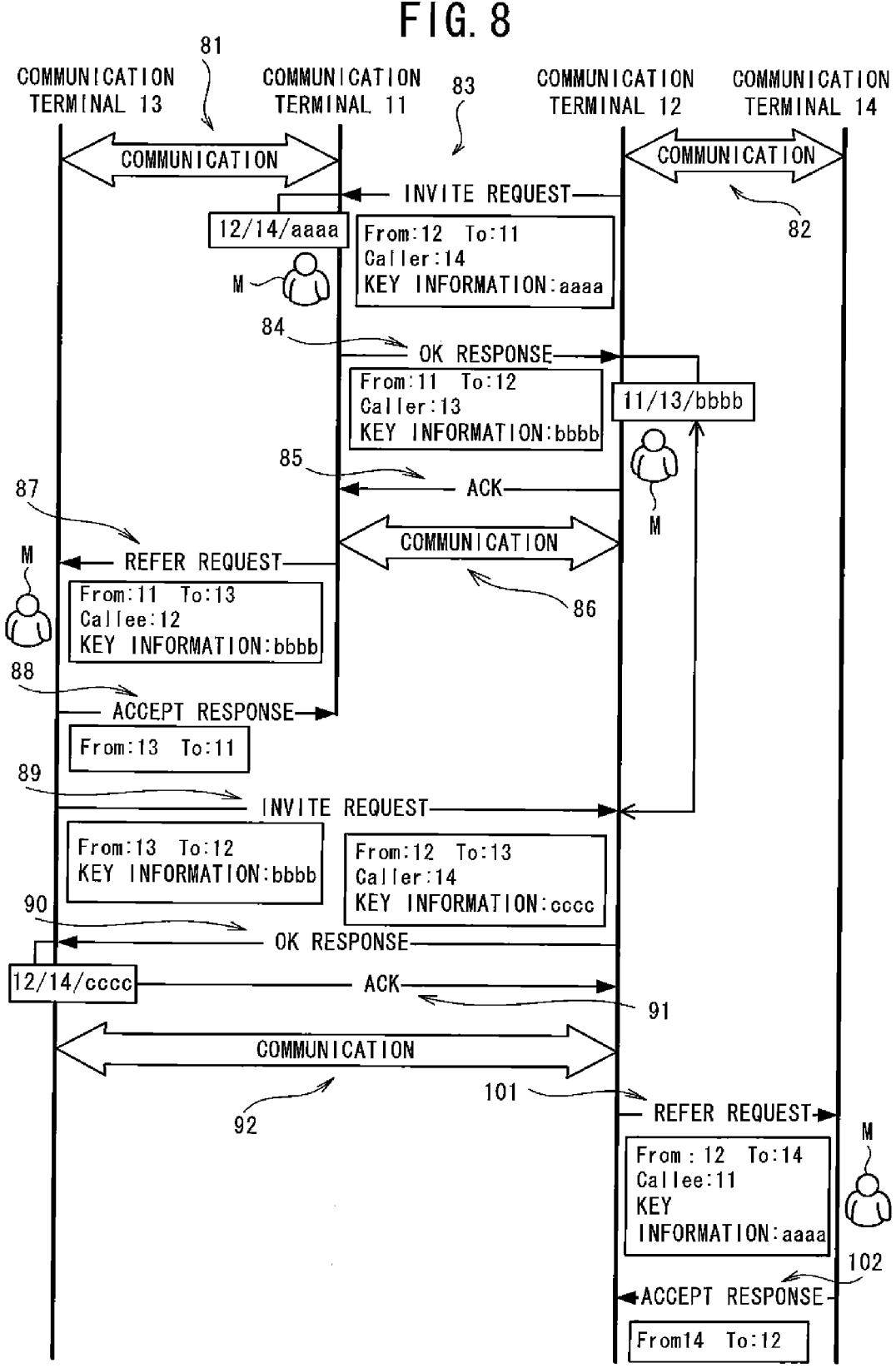
FIG. 8 is a diagram showing a communication sequence.
Figure 9:
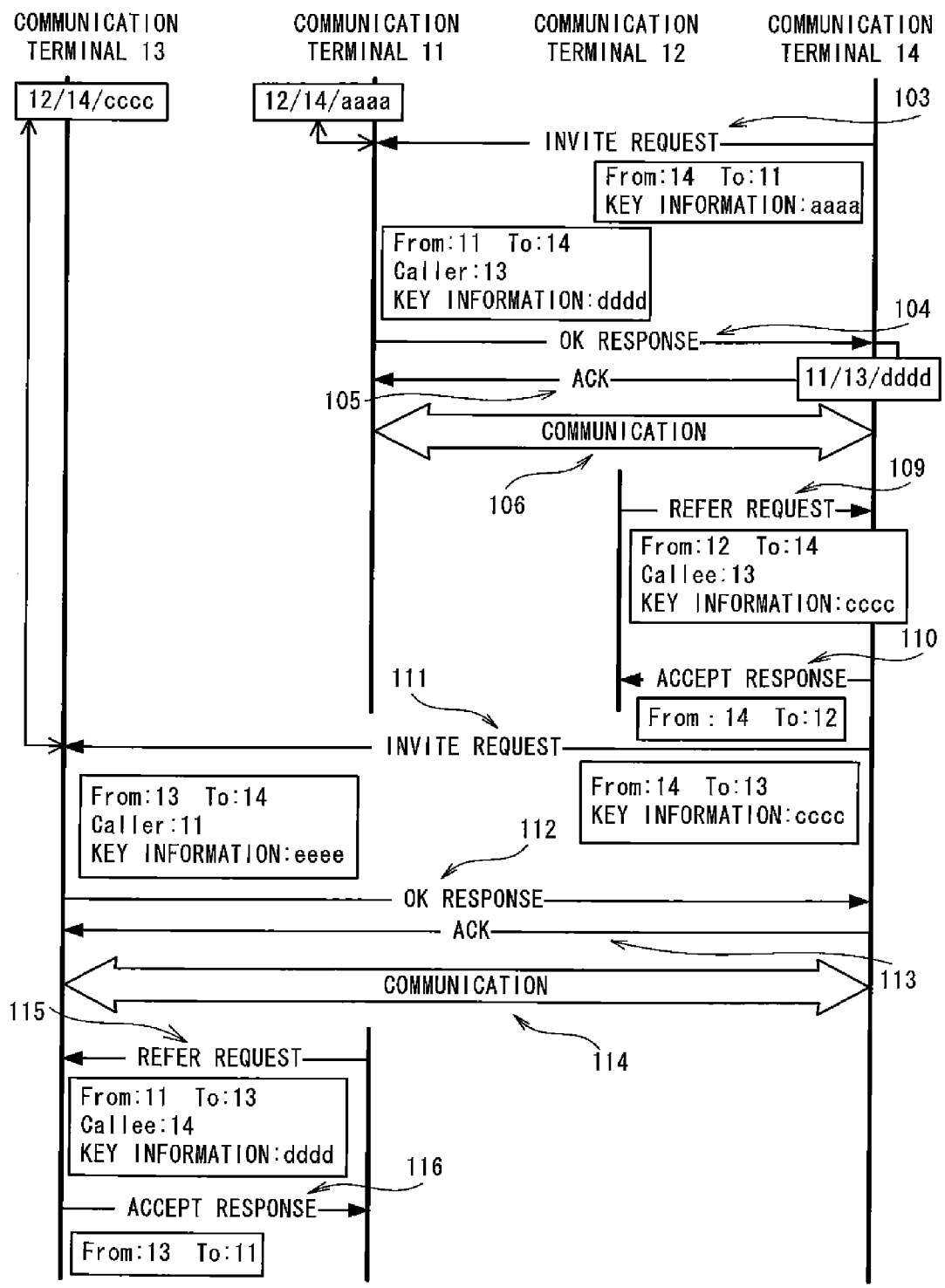
FIG. 9 is a diagram showing a communication sequence.

A procedure until communication is established between the communication terminals 11, 12, 13 and 14 and P2P communication thereby becomes possible will be explained with reference to FIG. 8 and FIG. 9. The explanation is omitted or simplified for parts where the same processing as that in the above-described first and second examples is performed. As shown in FIG. 8, the communication terminal 11 and the communication terminal 13 are performing P2P communication (81). The communication terminal 12 and the communication terminal 14 are performing P2P communication (82). FIG. 8 and FIG. 9 each show a case in which the communication terminal 12 establishes communication with the communication terminal 11 and thereby performs P2P communication.

The user of the communication terminal 12 inputs, to the communication terminal 12, a command to establish communication with the communication terminal 11 and start P2P communication. The communication terminal 12 determines key information "aaaa". The communication terminal 12 transmits an INVITE request to the communication terminal 11. The determined key information "aaaa" is associated with the INVITE request. Further, the ID "14" of the communication terminal 14 that has established communication with the communication terminal 12 is associated with the INVITE request as the "Caller ID". The communication terminal 11 receives the INVITE request (83). The communication terminal 11 stores, in the key information table, the ID "12" of the communication terminal 12 that has transmitted the INVITE request, and the Caller ID "14" and the key information "aaaa" that have been associated with the INVITE request.

In a case where establishment of communication with the communication terminals 12 and 14 is permitted by the user of the communication terminal 11, the communication terminal 11 determines key information "bbbb". The communication terminal 11 transmits an OK response to the communication terminal 12. The determined key information "bbbb" is associated with the OK response. Further, the ID "13" of the communication terminal 13 that has established communication with the communication terminal 11 is associated with the OK response as the Caller ID. The communication terminal 12 receives the OK response (84). The communication terminal 12 stores, in the key information table, the ID "11" of the communication terminal 11 that has transmitted the OK response, and the Caller ID "13" and the key information "bbbb" that have been associated with the OK response. In a case where establishment of communication with the communication terminals 11 and 13 is permitted by the user of the communication terminal 12, the communication terminal 12 transmits an ACK to the communication terminal 11. The communication terminal 11 receives the ACK (85). Communication between the communication terminal 11 and the communication terminal 12 is established. P2P communication is performed between the communication terminal 11 and the communication terminal 12 (86).

After the communication terminal 11 has received the ACK from the communication terminal 12, the communication terminal 11 transmits a REFER request to the communication terminal 13. The key information "bbbb", which has been associated with the OK response (refer to 84) transmitted from the communication terminal 11 to the communication terminal 12, is associated with the REFER request. Further, the ID "12" of the communication terminal 12 that is a destination of the OK response transmitted by the communication terminal 11 is associated with the REFER request as the "Callee ID". The communication terminal 13 receives the REFER request (87). In a case where establishment of communication with the communication terminal 12 is permitted by the user of the communication terminal 13, the communication terminal 13 transmits an ACCEPT response to the communication terminal 11. The communication terminal 11 receives the ACCEPT response (88).

In order to establish communication with the communication terminal 12, the communication terminal 13 transmits an INVITE request to the communication terminal 12. The key information "bbbb" associated with the received REFER request is associated with the INVITE request. The communication terminal 12 receives the INVITE request (89). The communication terminal 12 determines whether or not the ID "13" of the communication terminal 13 that has transmitted the received INVITE request matches the "Caller ID" stored in the key information table. Further, the communication terminal 12 determines whether or not the key information "bbbb" associated with the received INVITE request matches the key information stored in the key information table. If they match with each other, the communication terminal 12 does not perform a display to inquire of the user whether or not to permit establishment of communication. The communication terminal 12 determines key information "cccc". The communication terminal 12 transmits an OK response to the communication terminal 13. The determined key information "cccc" is associated with the OK response. Further, the ID "14" of the communication terminal 14 that has established communication with the communication terminal 12 is associated with the OK response as the Caller ID. The communication terminal 13 receives the OK response (90). The communication terminal 13 stores, in the key information table, the ID "12" of the communication terminal 12 that has transmitted the OK response, and the Caller ID "14" and the key information "cccc" that have been associated with the OK response. The communication terminal 13 transmits an ACK to the communication terminal 12. The communication terminal 12 receives the ACK (91). Communication between the communication terminal 12 and the communication terminal 13 is established. P2P communication is performed between the communication terminal 12 and the communication terminal 13 (92).

After the communication terminal 12 has transmitted the ACK to the communication terminal 11 (85, refer to FIG. 8), the communication terminal 12 transmits a REFER request to the communication terminal 14. The key information "aaaa", which has been associated with the INVITE request (refer to 83) that has been transmitted from the communication terminal 12 to the communication terminal 11, is associated with the REFER request. Further, the ID "11" of the communication terminal 11 that is a destination of the INVITE request (refer to 83) transmitted by the communication terminal 12 is associated with the REFER request as the Callee ID. The communication terminal 14 receives the REFER request (101). In a case where establishment of communication with the communication terminal 11 is permitted by the user of the communication terminal 14, the communication terminal 14 transmits an ACCEPT response to the communication terminal 12. The communication terminal 12 receives the ACCEPT response (102).

As shown in FIG. 9, in order to establish communication with the communication terminal 11, the communication terminal 14 transmits an INVITE request to the communication terminal 11. The key information "aaaa" associated with the received REFER request is associated with the INVITE request. The communication terminal 11 receives the INVITE request (103). The communication terminal 11 determines whether or not the ID "14" of the communication terminal 14 that has transmitted the received INVITE request matches the Caller ID stored in the key information table. Further, the communication terminal 11 determines whether or not the key information "aaaa" associated with the received INVITE request matches the key information stored in the key information table. If they match with each other, the communication terminal 11 does not perform a display to inquire of the user whether or not to permit establishment of communication. The communication terminal 11 determines key information "dddd". The communication terminal 11 transmits an OK response to the communication terminal 14. The determined key information "dddd" is associated with the OK response. Further, the ID "13" of the communication terminal 13 that has established communication with the communication terminal 11 is associated with the OK response as the Caller ID. The communication terminal 14 receives the OK response (104). The communication terminal 14 stores, in the key information table, the ID "11" of the communication terminal 11 that has transmitted the OK response, and the Caller ID "13" and the key information "dddd" that have been associated with the OK response. The communication terminal 14 transmits an ACK to the communication terminal 11. The communication terminal 11 receives the ACK (105). Communication between the communication terminal 11 and the communication terminal 14 is established. P2P communication is performed between the communication terminal 11 and the communication terminal 14 (106).

After the communication terminal 12 has received the ACK (91, refer to FIG. 8) from the communication terminal 13, the communication terminal 12 transmits a REFER request to the communication terminal 14. The key information "cccc", which has been associated with the OK response (90, refer to FIG. 8) that has been transmitted from the communication terminal 12 to the communication terminal 13, is associated with the REFER request. Further, the ID "13" of the communication terminal 13 that has transmitted the INVITE request to the communication terminal 12 is associated with the REFER request as the Callee ID. The communication terminal 14 receives the REFER request (109). In a case where establishment of communication with the communication terminal 13 is permitted by the user of the communication terminal 14, the communication terminal 14 transmits an ACCEPT response to the communication terminal 12. The communication terminal 12 receives the ACCEPT response (110).

After the communication terminal 14 has transmitted the ACCEPT response to the communication terminal 12, in order to establish communication with the communication terminal 13, the communication terminal 14 transmits an INVITE request to the communication terminal 13. The key information "cccc" associated with the REFER request (109) is associated with the INVITE request. The communication terminal 13 receives the INVITE request (111). The communication terminal 13 determines whether or not the ID "14" of the communication terminal 14 that has transmitted the received INVITE request matches the Caller ID stored in the key information table. Further, the communication terminal 13 determines whether or not the key information "cccc" associated with the received INVITE request matches the key information stored in the key information table. If they match with each other, the communication terminal 13 does not perform a display to inquire of the user whether or not to permit establishment of communication. The communication terminal 13 determines key information "eeee". The communication terminal 13 transmits an OK response to the communication terminal 14. The determined key information "eeee" is associated with the OK response. Further, the ID "11" of the communication terminal 11 that has established communication with the communication terminal 13 is associated with the OK response as the Caller ID. The communication terminal 14 receives the OK response (112). The communication terminal 14 transmits an ACK to the communication terminal 13. The communication terminal 13 receives the ACK (113). Communication between the communication terminal 13 and the communication terminal 14 is established. P2P communication is performed between the communication terminal 13 and the communication terminal 14 (114).

After the communication terminal 11 has received the ACK (refer to 105) from the communication terminal 14, the communication terminal 11 transmits a REFER request to the communication terminal 13. The key information "dddd", which has been associated with the OK response (refer to 104) that has been transmitted from the communication terminal 11 to the communication terminal 14, is associated with the REFER request. Further, the ID "14" of the communication terminal 14 that is a destination of the transmitted OK response is associated with the REFER request as the Callee ID. The communication terminal 13 receives the REFER request (115). The communication terminal 13 transmits an ACCEPT response to the communication terminal 11. The communication terminal 11 receives the ACCEPT response (116). In this situation, communication has already been established between the communication terminal 13 and the communication terminal 14 (refer to 114). In the establishment state table stored in the communication terminal 13, the communication state of the communication terminal ID "14" is "during communication". In this case, the communication terminal 13 does not transmit an INVITE request to the communication terminal 14. In this manner, even in a case where the communication terminal 13 has received the REFER request, the communication terminal 13 does not transmit an INVITE request to the communication terminal 14 with which communication has been established. Thus, the communication terminal 13 can reduce a communication volume necessary to establish communication, and traffic of the network 15 can therefore be reduced. Further, the communication terminal 13 can rapidly establish terminal-to-terminal communication.

As described above, without being subject to communication control by a parent terminal, the communication terminals 10 can establish communication between them and start P2P communication. Because the parent terminal is not required, a user operation to set the parent terminal to the child terminal is not required. Further, it is possible to eliminate a constraint that the parent terminal cannot separate from the communication terminals 10 with which communication have been established.

Main processing that is performed by the communication terminal 10 will be explained with reference to flowcharts shown in FIG. 10 to FIG. 14. The main processing is started and performed by the CPU 21 when a power source of the communication terminal 10 is turned on.

When the main processing is started, it is determined whether or not the user has performed an input operation to establish communication with another communication terminal 10 (step S11). Hereinafter, a counterpart communication terminal 10 that is requested to establish communication is referred to as a "request destination terminal". In a case where the input operation to establish communication with the request destination terminal has been performed (yes at step S11), the establishment state table is referred to. It is determined whether or not the communication state "during communication" is stored in the establishment state table. In a case where the communication state "during communication" is stored in the establishment state table, the ID associated with the communication state "during communication" is associated with the INVITE request as the Caller ID. In a case where the communication state "during communication" is stored in the establishment state table, the key information is determined (step S13). The determined key information is also associated with the INVITE request.

The INVITE request is transmitted to the request destination terminal (step S15). The ID of the request destination terminal is stored in the establishment state table. In the establishment state table, the communication state "during request transmission" is stored as a communication state that corresponds to the ID of the request destination terminal (step S16).

After the INVITE request has been transmitted to the request destination terminal, it is monitored whether or not an OK response has been received (step S17). In a case where the request destination terminal rejects establishment of communication, the request destination terminal transmits a BUSY response (step S96, refer to FIG. 14). In a case where the OK response has not been received (no at step S17) and the BUSY response has been received instead, it is not possible to establish communication with the request destination terminal. Therefore, the processing returns to step S11.

In a case where the request destination terminal permits establishment of communication, the request destination terminal transmits an OK response. In a case where the OK response has been received (yes at step S17), it is determined whether or not the Caller ID is associated with the OK response. If the Caller ID is associated with the OK response and the associated Caller ID is stored in the establishment state table, it means that establishment of communication with the communication terminal 10 identified by the Caller ID has already been permitted by the user. The communication terminal 10 identified by the Caller ID is a communication terminal 10 that has established communication with the request destination terminal. Hereinafter, this communication terminal 10 is referred to as a "first established terminal". If the Caller ID is not associated with the OK response, it means that there is no communication terminal 10 that has established communication with the request destination terminal. In a case where the Caller ID is not associated with the OK response, or in a case where the Caller ID is associated with the OK response and the associated Caller ID is stored in the establishment state table, there is no need to cause the user to determine whether or not to permit establishment of communication with the first established terminal (no at step S18). In order to transmit an ACK to the request destination terminal, the processing proceeds to step S21 (refer to FIG. 11).

In a case where the Caller ID is associated with the OK response and the associated Caller ID is not stored in the establishment state table, it is necessary to cause the user to determine whether or not to permit establishment of communication with the first established terminal (yes at step S18). The Caller ID is displayed on the display 26 in order to notify the first established terminal to the user. A display to inquire of the user whether or not to establish communication with the first established terminal is displayed on the display 26. The user determines whether or not to permit establishment of communication with the first established terminal and inputs a determination result. In a case where a determination result indicating permission of establishment of communication with the first established terminal is input by the user (yes at step S19), the processing proceeds to step S21 (refer to FIG. 11) in order to transmit an ACK to the request destination terminal.

Figure 10:
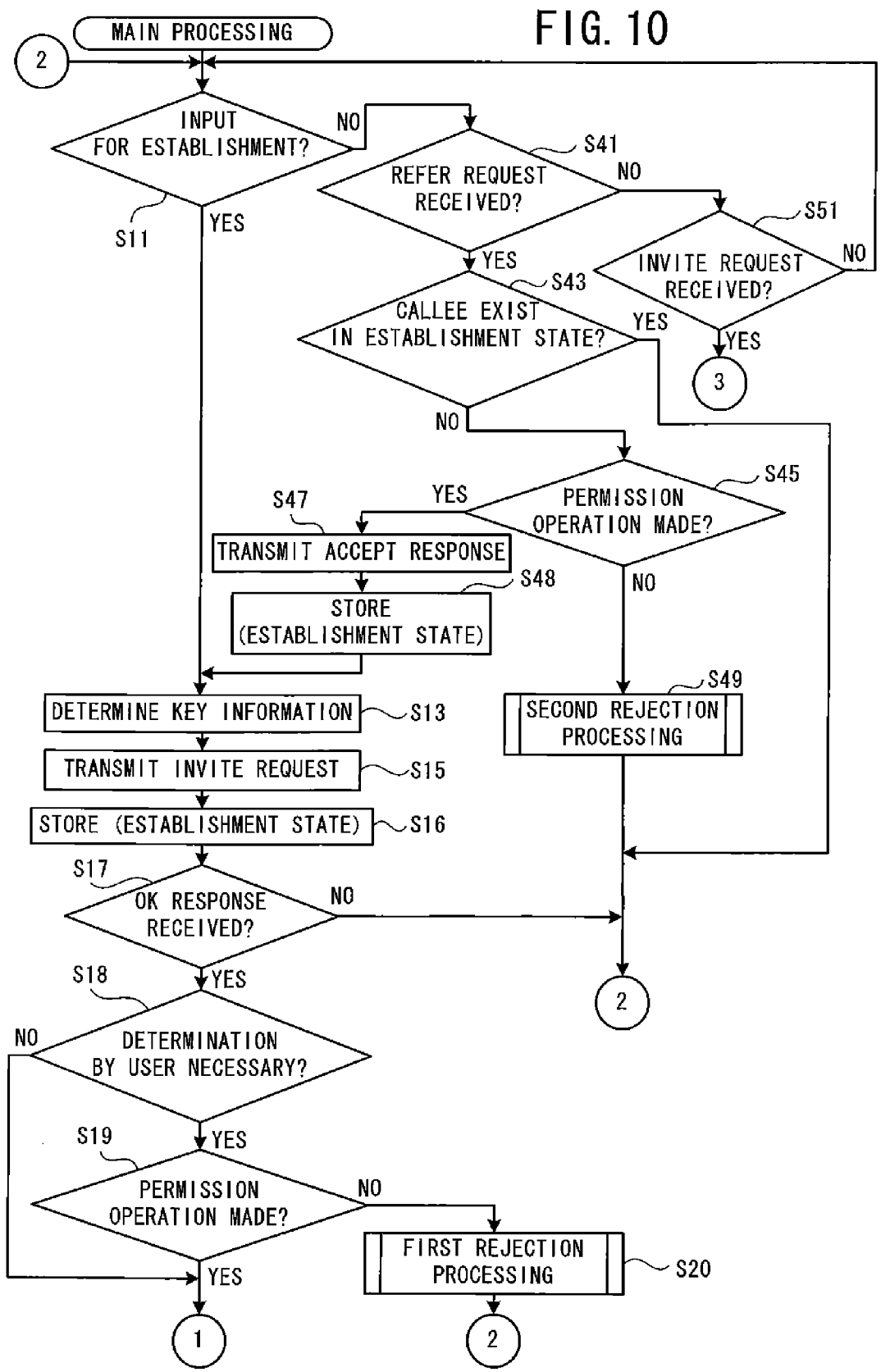
FIG. 10 is a flowchart showing main processing.

In a case where a determination result indicating rejection of establishment of communication with the first established terminal is input by the user (no at step S19), processing that stops communication performed to establish communication with the request destination terminal (first rejection processing) is performed (step S20). The first rejection processing will be explained with reference to FIG. 13. In the first rejection processing, the ID and the communication state of the request destination terminal stored in the establishment state table are deleted (step S91). A BYE request is transmitted to the request destination terminal (step S92). It is monitored whether or not an OK response that is transmitted from the request destination terminal in response to the BYE request has been received (step S93). In a case where the OK response has been received from the request destination terminal (yes at step S93), an ACK is transmitted to the request destination terminal (step S94). The first rejection processing ends and the processing returns to the main processing (refer to FIG. 10). In a case where the OK response has not been received from the request destination terminal (no at step S93), the first rejection processing ends and the processing returns to the main processing (refer to FIG. 10). As shown in FIG. 10, after the first rejection processing (step S20) has ended, the processing returns to the processing at step S11.

Figure 11:
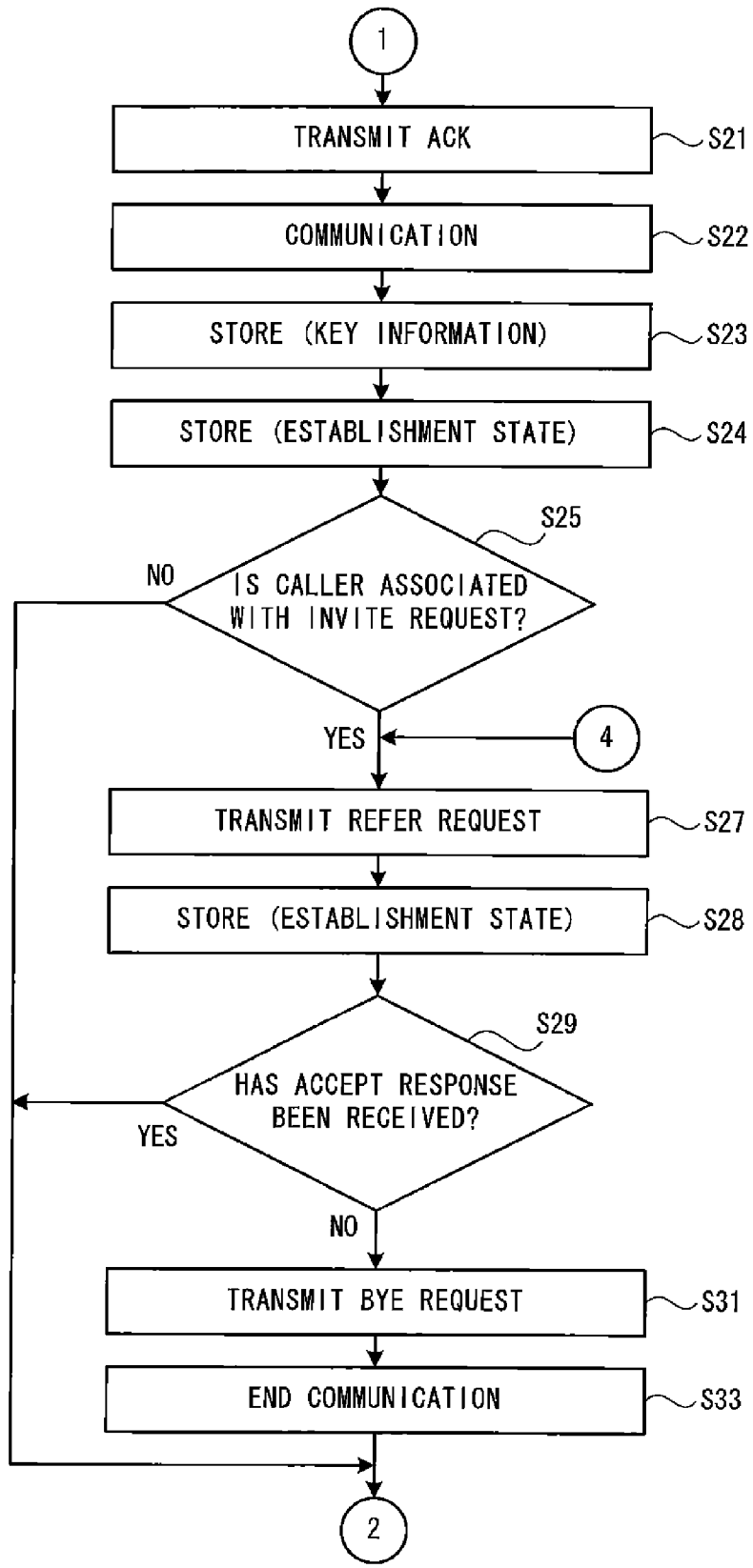
FIG. 11 is a flowchart showing the main processing, which is continued from FIG. 10.

As shown in FIG. 11, an ACK is transmitted to the request destination terminal in response to the OK response received at step S17 (refer to FIG. 10, step S21). Communication with the request destination terminal is established and P2P communication becomes possible. P2P communication is performed with the request destination terminal (step S22). In a case where the Caller ID and the key information are associated with the OK response received from the request destination terminal at step S17 (refer to FIG. 10), the ID of the request destination terminal, and Caller ID and the key information associated with the OK response are stored in the key information table (step S23). The Caller ID is stored in the establishment state table. The communication state "during communication" is stored as a communication state that corresponds to the Caller ID stored in the establishment state table (step S24).

It is determined whether or not the Caller ID has been associated with the INVITE request transmitted at step S15 (refer to FIG. 10) (step S25). In a case where the Caller ID has not been associated with the INVITE request (no at step S25), it means that, except the request destination terminal, there is no communication terminal 10 with which communication has been established. The processing returns to step S11 (refer to FIG. 10).

In a case where the Caller ID is associated with the INVITE request transmitted at step S15 (refer to FIG. 10) (yes at step S25), it means that, in addition to the request destination terminal, there is another communication terminal 10 with which communication has been established with the communication terminal 10. Hereinafter, another communication terminal (other than the request destination terminal) with which communication has been established with the communication terminal is referred to as a "second established terminal". A REFER request, which notifies that establishment of communication with the request destination terminal is permitted, is transmitted to the second established terminal (step S27). The ID of the request destination terminal is associated with the REFER request as the Callee ID. Further, the key information associated with the INVITE request transmitted at step S15 (refer to FIG. 10) is associated with the REFER request. The communication state "during request transmission" is stored as a communication state that corresponds to the ID of the second established terminal stored in the establishment state table (step S28). It is monitored whether or not an ACCEPT response, which is transmitted from the second established terminal in response to the REFER request, has been received (step S29). In a case where the ACCEPT response has been received from the second established terminal (yes at step S29), the processing returns to step S11 (refer to FIG. 10). In a case where the ACCEPT response has not been received from the second established terminal (no at step S29), it means that the second established terminal has rejected establishment of communication. In this case, the second established terminal transmits a BUSY response (step S96, refer to FIG. 14). The BUSY response transmitted from the second established terminal is received. In order to cancel the communication established with the request destination terminal, a BYE request is transmitted to the request destination terminal (step S31). The communication that has been established with the request destination terminal is cancelled and P2P communication is ended (step S33). The processing returns to step S11 (refer to FIG. 10).

On the other hand, as shown in FIG. 10, when the input operation to establish communication with the request destination terminal is not performed by the user (no at step S11), it is determined whether or not a REFER request has been received from the second established terminal (step S41). In a case where the REFER request has been received (yes at step S41), it means that the communication terminal 10 identified by the Callee ID associated with the REFER request desires to establish communication. Hereinafter, the communication terminal 10 identified by the Callee ID is referred to as an "establishment stand-by terminal". It is determined whether or not the Callee ID associated with the REFER request is stored in the establishment state table (step S43). In a case where the Callee ID associated with the REFER request is stored in the establishment state table (yes at step S43), it means that communication to establish communication has already been performed with the establishment stand-by terminal. In this case, an INVITE request is not transmitted to the establishment stand-by terminal. The processing returns to step S11.

In a case where the Callee ID associated with the REFER request is not stored in the establishment state table (no at step S43), processing to establish communication with the establishment stand-by terminal is performed. In order to notify the establishment stand-by terminal to the user, the Callee ID (the ID of the establishment stand-by terminal) associated with the REFER request is displayed on the display 26. A display to inquire of the user whether or not to establish communication with the establishment stand-by terminal is displayed on the display 26. The user determines whether or not to permit establishment of communication with the establishment stand-by terminal and inputs a determination result.

In a case where a determination result indicating rejection of establishment of communication with the establishment stand-by terminal is input by the user (no at step S45), processing that stops establishment of communication with the establishment stand-by terminal (second rejection processing) is performed (step S49). The second rejection processing will be explained with reference to FIG. 14. In the second rejection processing, the ID and the communication state of the establishment stand-by terminal stored in the establishment state table are deleted (step S95). A BUSY response is transmitted to the second established terminal (step S96). An ACK that is transmitted from the second established terminal in response to the BUSY response is received (step S97). The second rejection processing ends and the processing returns to the main processing (refer to FIG. 10). As shown in FIG. 10, after the second rejection processing (step S49) has ended, the processing returns to step S11.

In a case where a determination result indicating permission of establishment of communication with the establishment stand-by terminal is input by the user (yes at step S45), an ACCEPT response is transmitted to the second established terminal (step S47). In the establishment state table, the communication state "during request reception" is stored as a communication state that corresponds to the Callee ID associated with the REFER request received at step S41 (step S48). The processing proceeds to step S13, and the key information is determined (step S13). An INVITE request is transmitted to the establishment stand-by terminal (step S15). In a case where an OK response is received from the establishment stand-by terminal (yes at step S17), an ACK is transmitted to the establishment stand-by terminal (step S21, refer to FIG. 11). Communication is established with the establishment stand-by terminal and P2P communication becomes possible. P2P communication is performed with the establishment stand-by terminal (step S22, refer to FIG. 11). In the establishment state table, the communication state "during communication" is stored as a communication state that corresponds to the ID of the establishment stand-by terminal (step S24, refer to FIG. 11).

As shown in FIG. 10, in a case where an input operation to establish communication has not been performed by the user (no at step S11) and in a case where a REFER request has not been received from the second established terminal (no at step S41), it is determined whether or not an INVITE request has been received (step S51). Hereinafter, a communication terminal 10 that requests establishment of communication by transmitting an INVITE request is referred to as a "request source terminal". In a case where the INVITE request has not been received (no at step S51), the processing returns to step S11.

Figure 12:
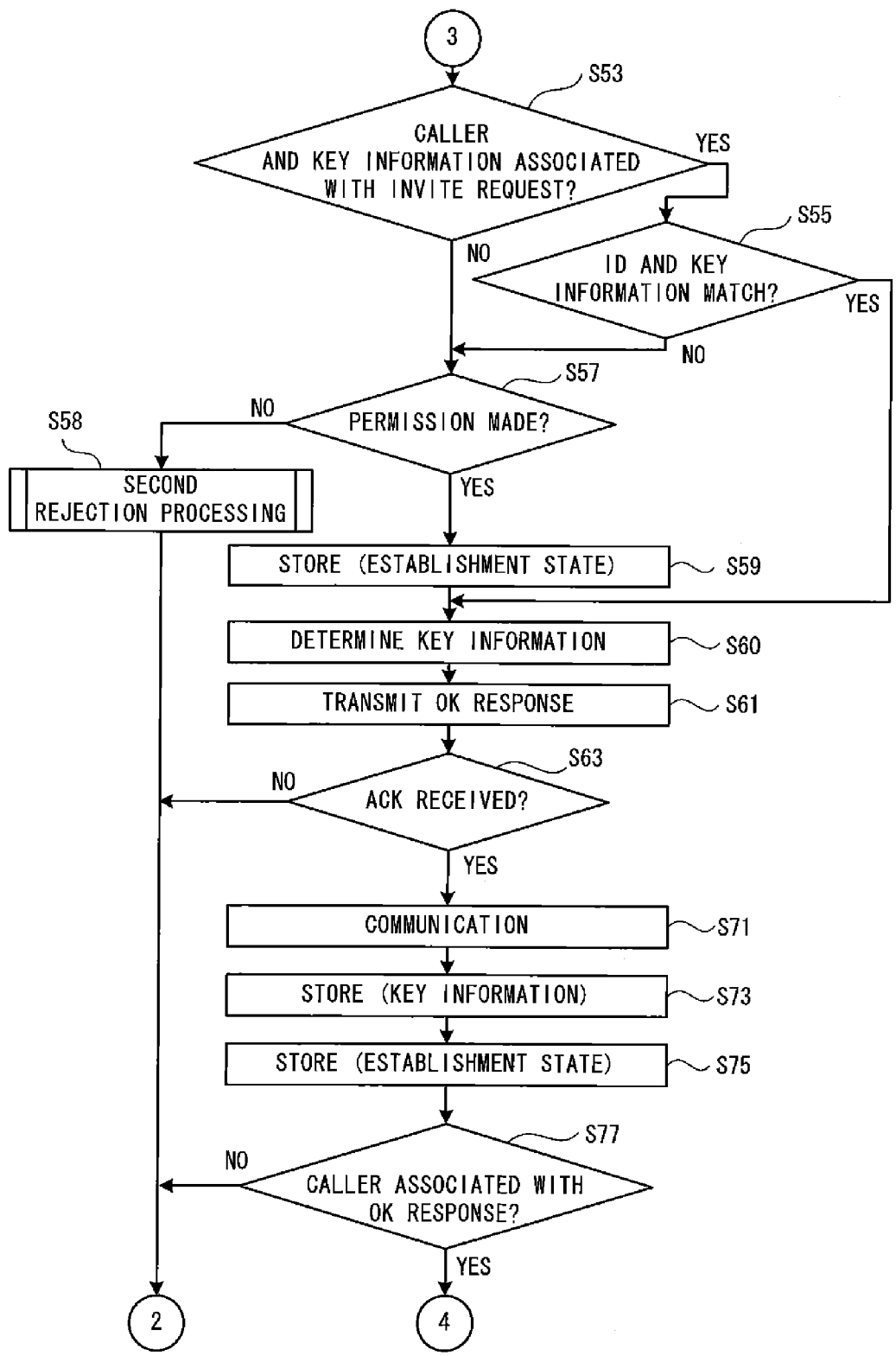
FIG. 12 is a flowchart showing the main processing, which is continued from FIG. 10.
Figure 13:
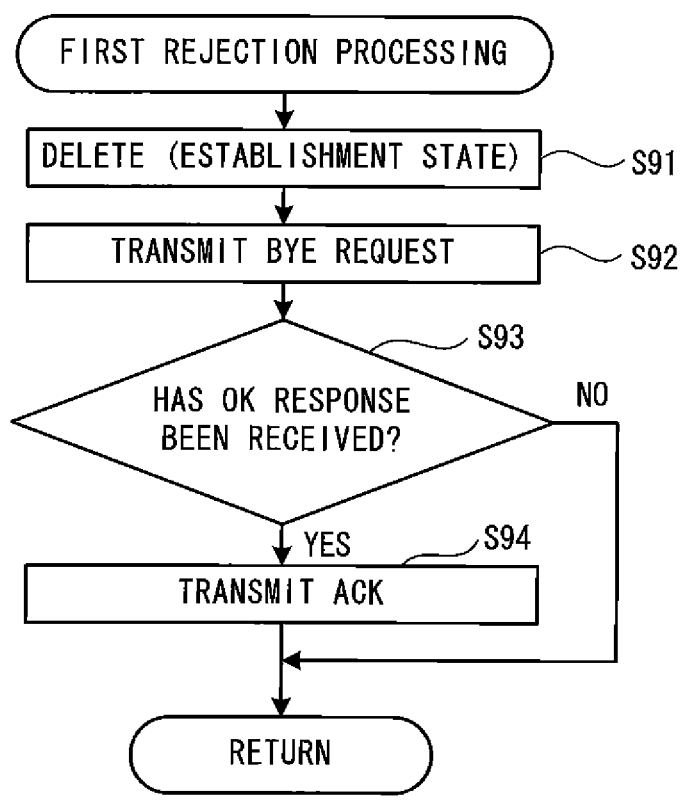
FIG. 13 is a flowchart showing first rejection processing.
Figure 14:
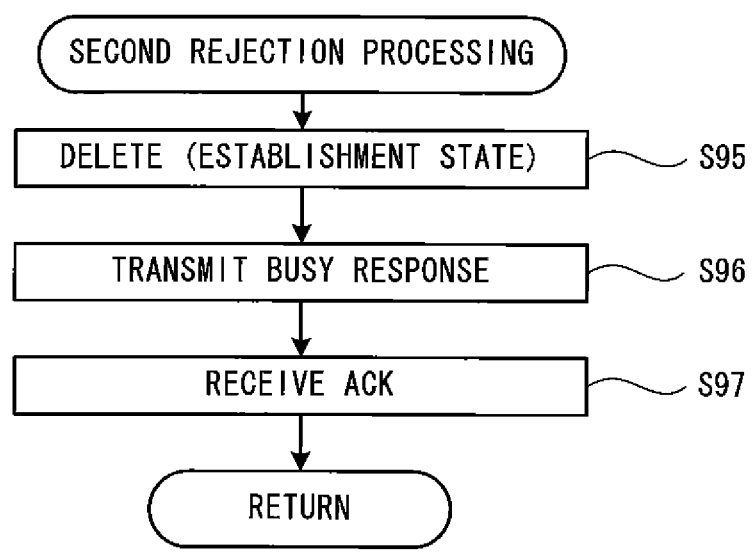
FIG. 14 is a flowchart showing second rejection processing.

In a case where the INVITE request has been received from the request source terminal (yes at step S51), it is determined whether or not the Caller ID and the key information are associated with the INVITE request, as shown in FIG. 12 (step S53). In a case where the Caller ID and the key information are not associated with the INVITE request (no at step S53), it means that there is no communication terminal 10 that has established communication with the request source terminal. The processing proceeds to step S57. In a case where the Caller ID and the key information are associated with the INVITE request (yes at step S53), the key information table is referred to. It is determined whether or not the Caller ID and the key information that are associated with the INVITE request are stored in the key information table (step S55). If the Caller ID and the key information associated with the INVITE request are stored in the key information table (yes at step S55), the request source terminal that has transmitted the INVITE request has already established communication with the request destination terminal. In this case, there is no need to notify the user of the fact that establishment of communication is requested. The processing proceeds to step S60 in order to transmit an OK response to the request source terminal. On the other hand, in a case where the Caller ID and the key information associated with the INVITE request are not stored in the key information table (no at step S55), it means that communication between the request source terminal and the request destination terminal has not been established. In this case, the processing proceeds to processing at step S57 in order to cause the user to determine whether or not to permit establishment of communication.

At step S57, in order to notify the request source terminal to the user, the ID of the request source terminal is displayed on the display 26. A display to inquire of the user whether or not to permit establishment of communication with the request source terminal is displayed on the display 26. The user determines whether or not to permit establishment of communication with the request source terminal and inputs a determination result. In a case where a determination result indicating rejection of establishment of communication with the request source terminal is input by the user (no at step S57), processing that stops establishment of communication with the request source terminal is performed (step S58). The second rejection processing performed at step S58 is the same as the second rejection processing performed at step S49 (refer to FIG. 10). The processing returns to step S11 (refer to FIG. 10). On the other hand, in a case where a determination result indicating permission of establishment of communication with the request source terminal is input by the user (yes at step S57), the ID of the request source terminal is stored in the establishment state table. In the establishment state table, the communication state "during request reception" is stored as a communication state that corresponds to the ID of the request source terminal (step S59). The processing proceeds to step S60 in order to transmit an OK response to the request source terminal.

At step S60, the establishment state table is referred to. It is determined whether or not the communication state "during communication" is stored in the establishment state table. In a case where the communication state "during communication" is stored in the establishment state table, the ID associated with the communication state "during communication" is associated with an OK response as the Caller ID. In a case where the communication state "during communication" is stored in the establishment state table, the key information is determined (step S60). The determined key information is also associated with the OK response. The OK response is transmitted to the request source terminal (step S61).

After the OK response has been transmitted to the request source terminal, it is monitored whether or not an ACK has been received (step S63). In a case where the request source terminal rejects establishment of communication, the request source terminal transmits a BUSY response (step S96, refer to FIG. 14). In a case where the ACK has not been received (no at step S63) and the BUSY response has been received, it is not possible to establish communication with the request source terminal. Therefore, the processing returns to step S11 (refer to FIG. 10).

In a case where the request source terminal permits establishment of communication, the request source terminal transmits an ACK. In a case where the ACK has been received from the request source terminal (yes at step S63), communication with the request source terminal is established and P2P communication becomes possible. P2P communication is performed with the request source terminal (step S71). It is determined whether or not the Caller ID and the key information are associated with the INVITE request that has been received from the request source terminal at step S51 (refer to FIG. 10). In a case where the Caller ID and the key information are associated with the received INVITE request, the ID of the request source terminal, and the Caller ID and the key information associated with the INVITE request are stored in the key information table (step S73). The Caller ID (the ID of the communication terminal 10 that has established communication with the request source terminal) associated with the INVITE request is stored in the establishment state table. The communication state "during communication" is stored as a communication state that corresponds to the Caller ID stored in the establishment state table (step S75).

It is determined whether or not the Caller ID has been associated with the OK response transmitted in the processing at step S61 (step S77). In a case where the Caller ID has not been associated with the OK response (no at step S77), it means that, except the request source terminal, there is no communication terminal 10 with which communication has been established. The processing returns to step S11 (refer to FIG. 10). In a case where the Caller ID is associated with the OK response transmitted in the processing at step S61 (yes at step S77), it means that there is a second established terminal. In this case, a REFER request, which notifies that establishment of communication with the request source terminal is permitted, is transmitted to the second established terminal (step S27, refer to FIG. 11). In response to the REFER request, it is monitored whether or not an ACCEPT response that is transmitted from the second established terminal has been received (step S29, refer to FIG. 11). In a case where the ACCEPT response has been received from the second established terminal (yes at step S29, refer to FIG. 11), the processing returns to step S11 (refer to FIG. 10).

As described above, a communication terminal 10 can establish communication with one or more of other communication terminals 10 and start P2P communication, without being subject to communication control by a parent terminal.

The present disclosure is not limited to the above-described embodiment and various types of modifications are possible. In the above-described embodiment, in a case where an INVITE request is received from the request source terminal in a state where there is a second established terminal, a REFER request is transmitted to the second established terminal after establishing communication with the request source terminal. In a case where the second established terminal receives the REFER request, it transmits an INVITE request to the request source terminal, thereby establishing communication with the request source terminal. The present disclosure is not limited to this method. Hereinafter, a modified example will be explained.

Figure 15:
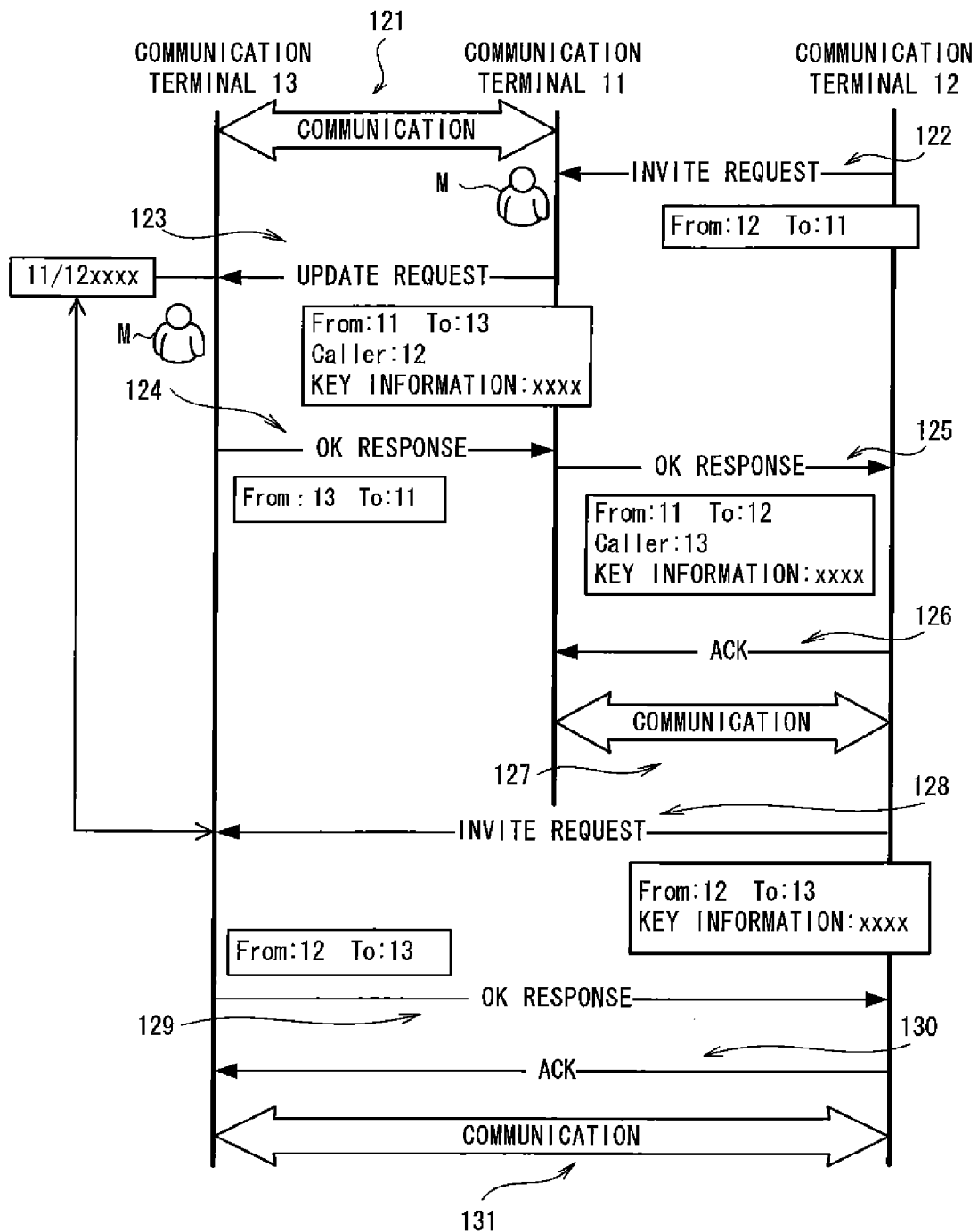
FIG. 15 is a diagram showing a communication sequence.

A communication procedure in the modified example will be explained with reference to FIG. 15. The explanation of the same processing as that in the above-described embodiment is omitted or simplified. Communication between the communication terminal 11 and the communication terminal 13 has already been established and P2P communication is possible. The communication terminal 11 and the communication terminal 13 are performing P2P communication (121). The modified example shows a case in which the communication terminal 12 establishes communication with the communication terminal 11 and thereby performs P2P communication.

The communication terminal 12 transmits an INVITE request to the communication terminal 11. The communication terminal 11 receives the INVITE request (122). In a case where information indicating permission of establishment of communication with the communication terminal 12 is input by the user of the communication terminal 11, the communication terminal 11 determines key information "xxxx". The communication terminal 11 transmits to the communication terminal 13 a notification packet that notifies that establishment of communication with another communication terminal 10 is permitted. Hereinafter, the notification packet is referred to as an "UPDATE request". The determined key information "xxxx" is associated with the UPDATE request. Further, the ID "12" of the communication terminal 12, which has requested establishment of communication by transmitting the INVITE request, is associated with the UPDATE request as a "Caller ID". The communication terminal 13 receives the UPDATE request (123).

In a case where information indicating permission of establishment of communication with the communication terminal 12 is input by the user of the communication terminal 13, the communication terminal 13 transmits an OK response to the communication terminal 11. The communication terminal 11 receives the OK response (124). The communication terminal 13 stores, in the key information table, the ID "11" of the communication terminal 11 that has transmitted the UPDATE request, and the Caller ID "12" and the key information "xxxx" that have been associated with the UPDATE request.

The communication terminal 11 transmits an OK response to the communication terminal 12. The key information "xxxx" associated with the UPDATE request that has been transmitted to the communication terminal 13 is associated with the OK response. Further, the ID "13" of the communication terminal 13 that has established communication with the communication terminal 11 is associated with the OK response as a "Callee ID". The communication terminal 12 receives the OK response (125). The communication terminal 12 transmits an ACK to the communication terminal 11. The communication terminal 11 receives the ACK (126). Communication between the communication terminal 11 and the communication terminal 12 is established. P2P communication is performed between the communication terminal 11 and the communication terminal 12 (127).

After the communication terminal 12 has transmitted the ACK to the communication terminal 11, the communication terminal 12 transmits an INVITE request to the communication terminal 13. The key information "xxxx" associated with the received OK response (refer to 125) is associated with the INVITE request. The communication terminal 13 receives the INVITE request (128). The communication terminal 13 determines whether or not the ID "12" of the communication terminal 12 that has transmitted the received INVITE request matches the "Caller ID" stored in the key information table. Further, the communication terminal 13 determines whether or not the key information "xxxx" associated with the received INVITE request is stored in the key information table. If they match with each other, the communication terminal 13 transmits an OK response to the communication terminal 12. The communication terminal 12 receives the OK response (129). The communication terminal 12 transmits an ACK to the communication terminal 13. The communication terminal 13 receives the ACK (130). Communication between the communication terminal 12 and the communication terminal 13 is established. P2P communication is performed between the communication terminal 12 and the communication terminal 13 (131). As described above, even in a case where the UPDATE request is used instead of the REFER request, the communication terminal 10 can perform communication to establish communication with another communication terminal 10. With the use of the UPDATE request, the communication terminal 10 that has not established communication can transmit an INVITE request to the other communication terminal 10 that has established communication. Thus, it is possible to establish communication with another communication terminal 10 without imposing a processing load on the communication terminal with which communication has been established.

Note that, in the above description, the communication terminal 11 that has received the INVITE request transmitted from the communication terminal 12 transmits the UPDATE request to the communication terminal 13 that has established communication with the communication terminal 11. However, the modified example is not limited to this procedure, and communication may be established according to another procedure. For example, communication may be established according to the following procedure.

The user of the communication terminal 11 inputs, to the communication terminal 11, a request to establish communication with the communication terminal 12. An INVITE request is transmitted from the communication terminal 11 to the communication terminal 12. The communication terminal 12 receives the INVITE request. In a case where information indicating permission of establishment of communication is input by the user of the communication terminal 12, an OK response is transmitted from the communication terminal 12 to the communication terminal 11. In a case where the communication terminal 11 receives the OK response, the communication terminal 11 transmits an UPDATE request to the communication terminal 13 with which communication has been established. The communication terminal 13 that has received the UPDATE request inquires of the user of the communication terminal 13 whether or not to permit establishment of communication with the communication terminal 12. When establishment of communication with the communication terminal 12 is permitted, the communication terminal 13 transmits an OK response to the communication terminal 11. When the communication terminal 11 receives the OK response transmitted from the communication terminal 13, the communication terminal 11 transmits an ACK to the communication terminal 12. The communication terminal 12 receives the ACK transmitted from the communication terminal 11. The communication terminal 12 transmits an INVITE request to the communication terminal 13. In response to the INVITE request transmitted from the communication terminal 12, an OK response is transmitted from the communication terminal 13 to the communication terminal 12. The communication terminal 12 receives the OK response. An ACK is transmitted from the communication terminal 12 to the communication terminal 13. Thus, communication between the communication terminals 11 and 13 and the communication terminal 12 is established, and P2P communication becomes possible.

Main processing of the modified example that is performed by the communication terminal 10 will be explained with reference to flowcharts shown in FIG. 16 to FIG. 19. The explanation of the same processing as that of the above-described embodiment is omitted or simplified. The main processing is started and performed by the CPU 21 when the power source of the communication terminal 10 is turned on.

When the main processing is started, it is determined whether or not the user has performed an input operation to establish communication with a request destination terminal (step S101). In a case where the input operation to establish communication with the request destination terminal has been performed (yes at step S101), the establishment state table is referred to. It is determined whether or not the communication state "during communication" is stored in the establishment state table. In a case where the established state "during communication" is stored in the establishment state table, the ID associated with the established state "during communication" is associated with the INVITE request as the Callee ID. The key information is determined (step S103). The determined key information is associated with the INVITE request. The INVITE request is transmitted to the request destination terminal (step S105). The ID of the request destination terminal is stored in the establishment state table. In the establishment state table, the communication state "during request transmission" is stored as a communication state that corresponds to the ID of the request destination terminal (step S106).

After the INVITE request has been transmitted to the request destination terminal, it is monitored whether or not an OK response has been received (step S107). If the request destination terminal rejects establishment of communication, the OK response is not received. In this case, the OK response has not been received (no at step S107). The processing returns to step S101.

In a case where the request destination terminal permits establishment of communication, the request destination terminal transmits an OK response. In a case where the OK response has been received (yes at step S107), it is determined whether or not the Callee ID is associated with the OK response. The communication terminal 10 that is identified by the Callee ID corresponds to the first established terminal that has established communication with the request destination terminal. If the Callee ID is associated with the OK response and if the associated Callee ID is stored in the establishment state table, it means that the first established terminal that is identified by the Callee ID has already been permitted to establish communication by the user. Further, in a case where the Callee ID is not associated with the OK response, it means that there is no communication terminal 10 that has established communication with the request destination terminal. In a case where the Callee ID is not associated with the OK response, or in a case where the Callee ID is associated with the OK response and the associated Callee ID is stored in the establishment state table (yes at step S109), the processing proceeds to step S115.

In a case where the Callee ID is associated with the OK response and the associated Callee ID is not stored in the establishment state table (yes at step S109), it is necessary to cause the user to determine whether or not to permit establishment of communication with the first established terminal. The Callee ID is displayed on the display 26 in order to notify the first established terminal to the user. A display to inquire of the user whether or not to establish communication with the first established terminal is displayed on the display 26. The user determines whether or not to permit establishment of communication with the first established terminal and inputs a determination result. In a case where a determination result indicating permission of establishment of communication with the first established terminal is input by the user (yes at step S111), the processing proceeds to step S115. In a case where a determination result indicating rejection of establishment of communication with the first established terminal is input by the user (no at step S111), processing that stops communication performed to establish communication with the request destination terminal (first rejection processing) is performed (step S113), and the processing returns to step S101. The first rejection processing performed at step S113 is the same as the first rejection processing of the above-described embodiment (refer to FIG. 13).

At step S115, it is determined whether or not the Callee ID and the key information are associated with the INVITE request transmitted (refer to s105) to the request destination terminal at step S105 (step S115). The communication terminal 10 that is identified by the Callee ID corresponds to the second established terminal with which communication has been established. In a case where the Callee ID and the key information are not associated with the transmitted INVITE request (no at step S115), the processing proceeds to step S119 (refer to FIG. 17). In a case where the Callee ID and the key information are associated with the INVITE request (yes at step S115), an UPDATE request is transmitted to the second established terminal that is identified by the Callee ID (step S117). The ID of the request destination terminal is associated with the UPDATE request as the Caller ID. Further, the key information associated with the INVITE request transmitted at step S105 is associated with the UPDATE request. The Callee ID and the key information associated with the OK response received at step S107 are stored in the key information table (step S118).

Figure 16:
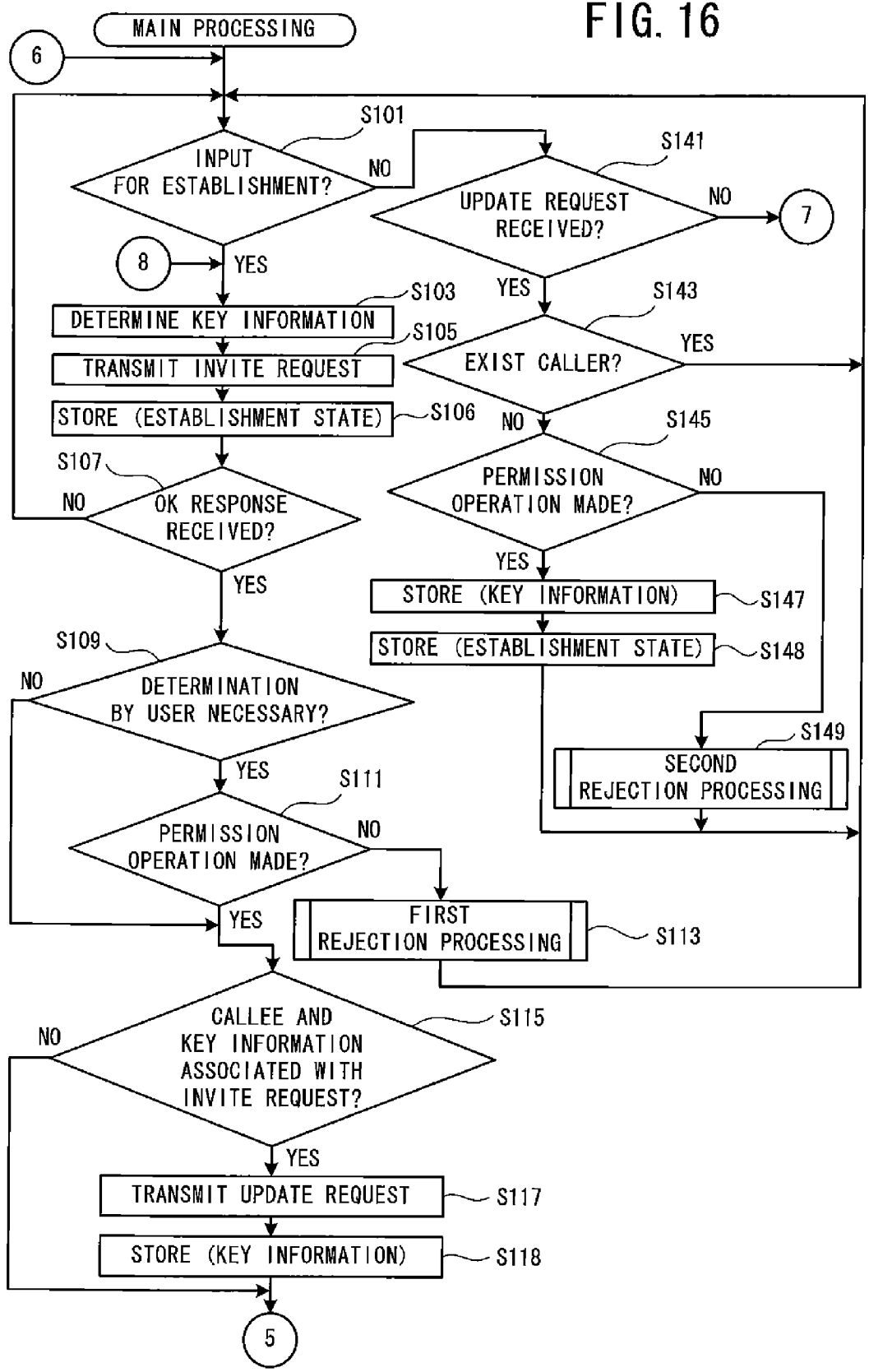
FIG. 16 is a flowchart showing main processing in a modified example.
Figure 17:
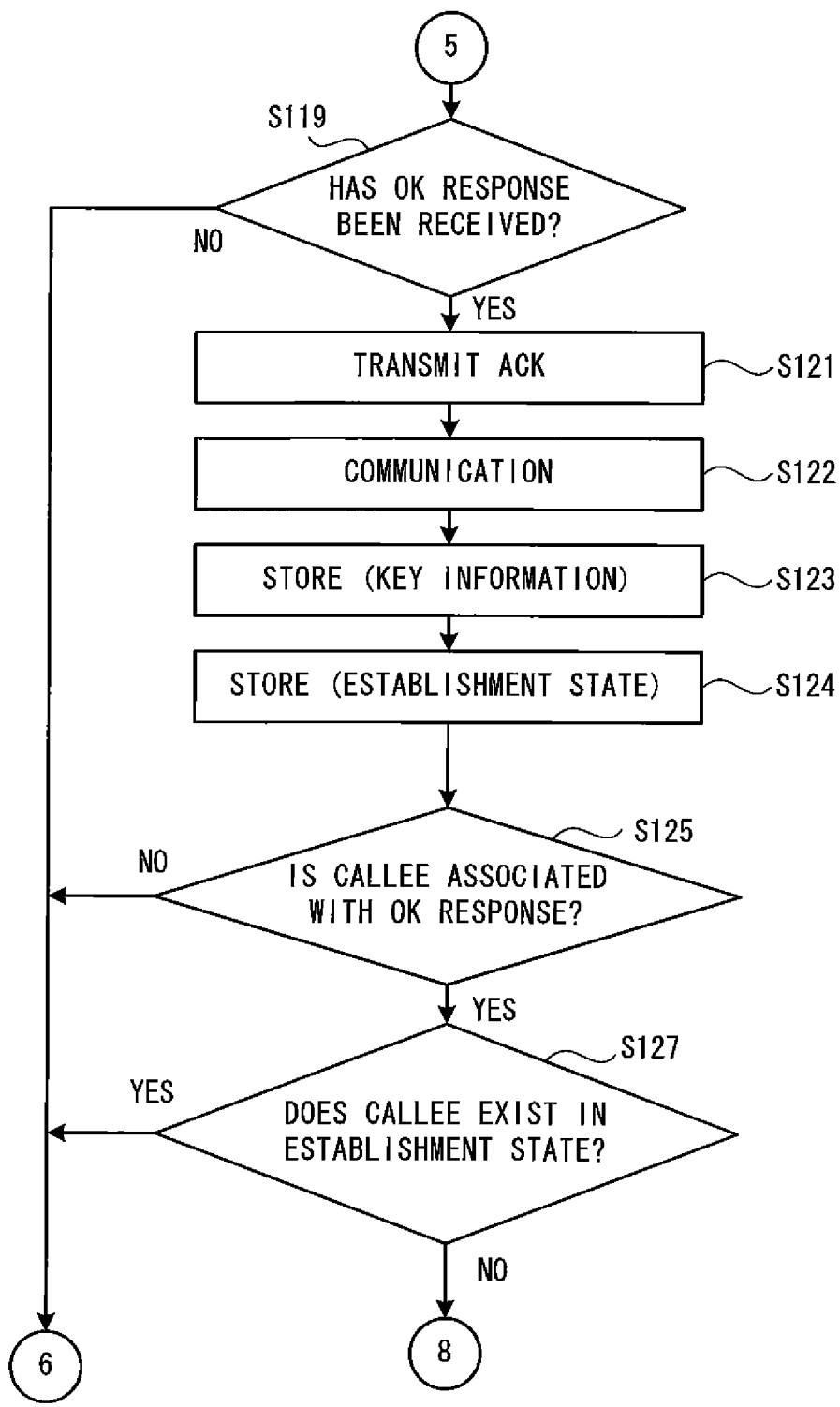
FIG. 17 is a flowchart showing the main processing in the modified example, which is continued from FIG. 16.

As shown in FIG. 17, it is monitored whether or not an OK response, which is transmitted from the second established terminal in response to the UPDATE request, has been received (step S119). In a case where the OK response has not been received from the second established terminal (no at step S119), it means that the second established terminal has rejected establishment of communication. The processing returns to step S101 (refer to FIG. 16). On the other hand, in a case where the OK response has been received from the second established terminal (yes at step S119), an ACK is transmitted to the request destination terminal (step S121). Note that, in a case where the UPDATE request is not transmitted, the processing proceeds to step S121 (yes at step S119) because the OK response has already been received at step S107, and an ACK is transmitted to the request destination terminal (step S121). Communication with the request destination terminal is established. P2P communication is performed with the request destination terminal (step S122). The Callee ID and the key information that are associated with the OK response received at step S107 or step S119 are stored in the key information table (step S123). The ID of the request destination terminal and the communication state "during communication" are stored in the establishment state table (step S124).

It is determined whether or not the Callee ID is associated with the OK response received at step S107 or step S119 (step S125). In a case where the Callee ID is not associated with the OK response (no at step S125), the processing returns to step S101 (refer to FIG. 16). In a case where the Callee ID is associated with the OK response (yes at step S125), it is determined whether or not the associated Callee ID is stored in the establishment state table (step S127). In a case where the Callee ID is stored in the establishment state table (yes at step S127), the processing returns to step S101 (refer to FIG. 16). In a case where the Callee ID is not stored in the establishment state table (no at step S127), the processing returns to step S103 (refer to FIG. 16) in order to transmit an INVITE request to the communication terminal 10 identified by the Callee ID.

As shown in FIG. 16, in a case where the input operation to establish communication with the request destination terminal has not been performed by the user (no at step S101), it is determined whether or not an UPDATE request has been received from the second established terminal (step S141). In a case where the UPDATE request has been received (yes at step S141), it is determined whether or not the Caller ID associated with the UPDATE request is stored in the establishment state table (step S143). The communication terminal 10 identified by the Caller ID corresponds to the establishment stand-by terminal that desires to establish communication. In a case where the Caller ID associated with the UPDATE request is stored in the establishment state table (yes at step S143), it means that communication is already being performed to establish communication with the establishment stand-by terminal identified by the Caller ID. The processing returns to step S101. In a case where the Caller ID associated with the UPDATE request is not stored in the establishment state table (no at step S143), the Caller ID associated with the UPDATE request is displayed on the display 26 in order to notify the establishment stand-by terminal to the user. A display to inquire of the user whether or not to establish communication with the establishment stand-by terminal is displayed on the display 26. The user determines whether or not to permit establishment of communication with the establishment stand-by terminal and inputs a determination result.

In a case where a determination result indicating rejection of establishment of communication with the establishment stand-by terminal is input by the user (no at step S145), processing that stops communication performed to establish communication with the establishment stand-by terminal (second rejection processing) is performed (step S149). The processing returns to step S101. The second rejection processing performed at step S149 is the same as the second rejection processing of the above-described embodiment (refer to FIG. 14). In a case where a determination result indicating permission of establishment of communication with the establishment stand-by terminal is input by the user (yes at step S145), the Caller ID and the key information that are associated with the UPDATE request received at step S141 are stored in the key information table (step S147). The Caller ID associated with the UPDATE request received at step S141 is stored in the establishment state table, and "during request reception" is stored as the communication state (step S148). An OK response is transmitted to the second established terminal and the processing returns to step S101.

Figure 18:
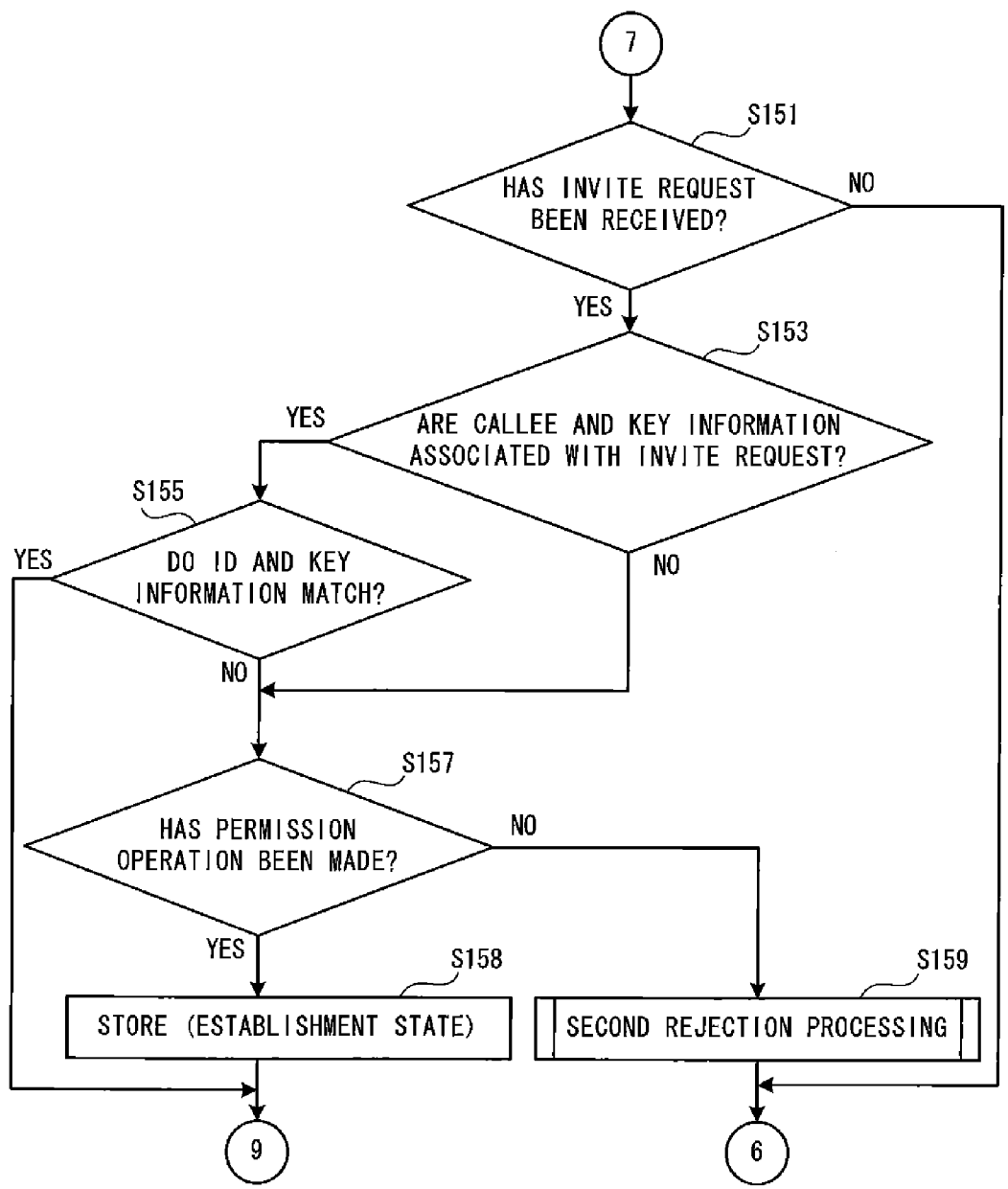
FIG. 18 is a flowchart showing the main processing in the modified example, which is continued from FIG. 16.

In a case where the input operation to establish communication has not been performed by the user (no at step S101) and the UPDATE request has not been received from the second established terminal (no at step S141), it is determined whether or not the INVITE request transmitted from the request source terminal has been received, as shown in FIG. 18 (step S151). In a case where the INVITE request has not been received (no at step S151), the processing returns to step S101 (refer to FIG. 16).

In a case where the INVITE request has been received from the request source terminal (yes at step S151), it is determined whether or not the Callee ID and the key information are associated with the INVITE request (step S153). In a case where the Callee ID and the key information are not associated with the INVITE request (no at step S153), it means that there is no communication terminal 10 that has established communication with the request source terminal. The processing proceeds to step S157. In a case where the Callee ID and the key information are associated with the INVITE request (yes at step S153), it means that there is a communication terminal 10 that has established communication with the request source terminal. Hereinafter, the communication terminal 10 that has established communication with the request source terminal is referred to as a "third established terminal". The key information table is referred to. It is determined whether or not the Callee ID and the key information that are associated with the received INVITE request are stored in the key information table (step S155). In a case where the Callee ID and the key information match the information stored in the key information table (yes at step S155), the processing proceeds to step S161 (refer to FIG. 19). In a case where the Callee ID and the key information do not match the information stored in the key information table (no at step S155), the processing proceeds to processing at step S157 in order to cause the user to determine whether or not to permit establishment of communication.

At step S157, in order to notify the third established terminal to the user, the Callee ID associated with the INVITE request is displayed on the display 26. A display to inquire of the user whether or not to establish communication with the third established terminal is displayed on the display 26. The user determines whether or not to permit establishment of communication with the third established terminal and inputs a determination result. In a case where a determination result indicating rejection of establishment of communication with the third established terminal is input by the user (no at step S157), processing that stops communication performed to establish communication with the request source terminal (second rejection processing) is performed (step S159). The second rejection processing performed at step S159 is the same as the second rejection processing of the above-described embodiment (refer to FIG. 14). The processing returns to step S101 (refer to FIG. 16). In a case where a determination result indicating permission of establishment of communication with the third established terminal is input by the user (yes at step S157), the ID of the third established terminal is stored in the establishment state table. In the establishment state table, the communication state "during request reception" is stored as a communication state that corresponds to the ID of the third established terminal (step S158). The processing proceeds to step S161 (refer to FIG. 19).

Figure 19:
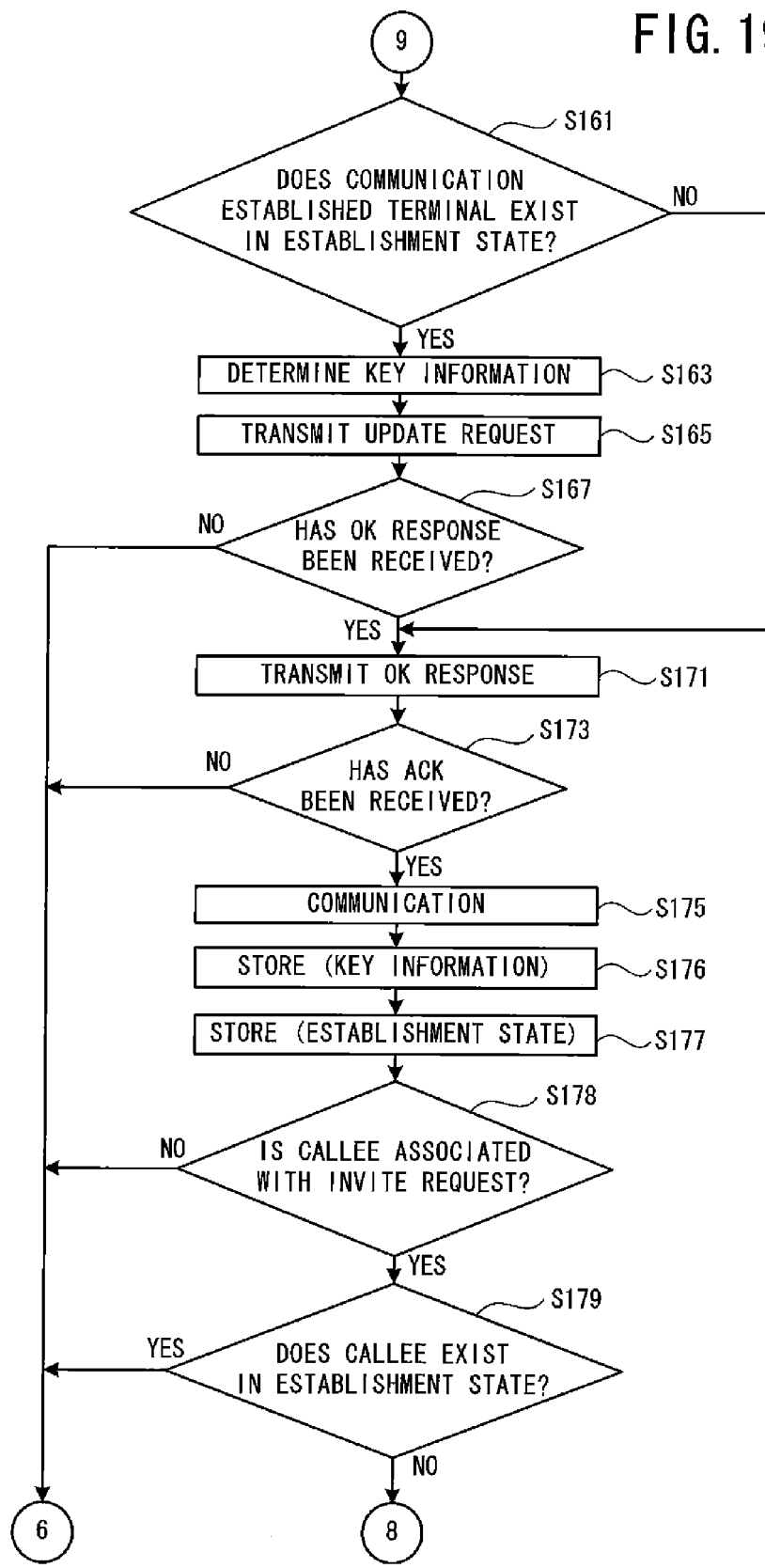
FIG. 19 is a flowchart showing the main processing in the modified example, which is continued from FIG. 18.

As shown in FIG. 19, at step S161, the establishment state table is referred to. It is determined whether or not the communication state "during communication" is stored in the establishment state table (step S161). In a case where the communication state "during communication" is not stored in the establishment state table (no at step S161), the processing proceeds to step S171. In a case where the communication state "during communication" is stored in the established state table (yes at step S161), the key information is determined (step S163). An UPDATE request is transmitted to the second established terminal (step S165). The ID of the third established terminal is associated with the UPDATE request as the Caller ID. Further, the key information determined at step S163 is associated with the UPDATE request. It is monitored whether or not an OK response, which is transmitted from the second established terminal in response to the UPDATE request, has been received (step S167). In a case where the OK response has not been received from the second established terminal (no at step S167), it means that the second established terminal has rejected establishment of communication. The processing returns to step S101 (refer to FIG. 16). In a case where the OK response has been received from the second established terminal (yes at step S167), the processing proceeds to step S171.

At step S171, an OK response is transmitted to the request source terminal (step S171). It is monitored whether or not an ACK transmitted from the request source terminal has been received (step S173). In a case where the ACK has not been received (no at step S173), it means that the request source terminal has rejected establishment of communication. The processing returns to step S101 (refer to FIG. 16). In a case where the ACK transmitted from the request source terminal has been received (yes at step S173), communication with the request source terminal is established. P2P communication is performed with the request source terminal (step S175). The ID of the request source terminal, and the Caller ID and the key information that are associated with the UPDATE request are stored in the key information table (step S176). The ID of the request source terminal and the communication state "during communication" are stored in the establishment state table (step S177).

It is determined whether or not the Callee ID is associated with the INVITE request received at step S151 (refer to FIG. 18) (step S178). In a case where the Callee ID is not associated with the received INVITE request (no at step S178), the processing returns to step S101 (refer to FIG. 16). In a case where the Callee ID is associated with the received INVITE request (yes at step S178), it is determined whether or not the associated Callee ID is stored in the establishment state table (step S179). In a case where the associated Callee ID is stored in the establishment state table (yes at step S179), the processing returns to step S101 (refer to FIG. 16). In a case where the associated Callee ID is not stored in the establishment state table (no at step S179), the processing returns to step S103 (refer to FIG. 16) in order to transmit an INVITE request to the communication terminal 10 identified by the Callee ID.

As explained above, in the modified example, the UPDATE request is used instead of the REFER request. Thus, in a similar manner to the above-described embodiment, a communication terminal 10 can perform P2P communication by establishing communication with one or more of other communication terminals 10 without intervention of a parent terminal. Further, the communication terminal 10 can start P2P communication by establishing communication with the other communication terminals 10 earlier as compared to the above-described embodiment in which the REFER request is used.

In the above description, the communication procedure is explained in which communication is established between two, three or four communication terminals 10. However, in the present disclosure, there is no limitation on the number of the communication terminals 10. Communication can be established between five or more of the communication terminals 10. Further, in a case where there are three or more groups of the communication terminals 10 that are establishing communication, communication can be established between the communication terminals 10 in a similar manner.

In the above description, the various types of packets to establish communication are transmitted and received between the communication terminals 10. However, the various types of packets may be transmitted and received via the SIP server 16 that connects to the network 15. The communication terminal 10 may perform communication of the various types of packets via the SIP server 16. The communication terminal 10 can perform communication to establish communication using a standardized SIP. Even in a case where the network 15 is divided by network address translation (NAT) devices, the communication terminal 10 can establish communication with a communication terminal subordinate to another NAT device.

In the above description, the timing to transmit the INVITE request to another communication terminal 10 may be adjusted as appropriate. Further, for example, in the communication sequence shown in FIG. 8, the time period until the communication terminal 13 transmits the INVITE request may be adjusted to be different from the time period until the communication terminal 14 transmits the INVITE request. The time period until the INVITE request is transmitted may be randomly determined, or may be uniquely identified by an ID, for example. Thus, the times at which the INVITE requests are transmitted can be made different from each other, and it is possible to inhibit the INVITE requests from being transmitted at the same time.

In the above description, in a case where a request to establish communication is transmitted, whether or not to permit establishment of communication is determined by inquiring of the user of the communication terminal 10. However, the ID of the communication terminal 10 with which communication can be established may be stored in advance in the communication terminal 10. Whether or not to permit establishment of communication may be determined based on the stored ID.

The above-described P2P communication may be performed using a Real-time Transport Protocol (RTP), for example.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A communication system comprising:
a first communication terminal that is connectable to a network;
a second communication terminal that is connectable to the network and that has not established communication with the first communication terminal; and
a third communication terminal that is connectable to the network and that has established communication with the first communication terminal; wherein
the second communication terminal comprises:
a first processor; and
a first memory storing computer-readable instructions, the instructions, when executed by the first processor, perform processes comprising:
first transmitting to the first communication terminal a first request packet that requests establishment of communication;

first receiving, after the first transmitting has transmitted the first request packet, from the first communication terminal a first permission packet that permits establishment of communication;

first communicating with the first communication terminal device, in a case where the first receiving has received the first permission packet from the first communication terminal;

second receiving a second request packet from the third communication terminal, after the first receiving has received the first permission packet from the first communication terminal;

second transmitting a second permission packet to the third communication terminal in a case where the second receiving has received the second request packet from the third communication terminal; and second communicating with the third communication terminal after the second transmitting has transmitted the second permission packet to the third communication terminal; wherein the first communication terminal comprises:

a second processor: and a second memory storing computer-readable instructions, the instructions, when executed by the second processor, perform processes comprising:

third receiving the first request packet from the second communication terminal;

third transmitting the first permission packet to the second communication terminal in a case where the third receiving has received the first request packet from the second communication terminal;

third communicating with the second communication terminal after the third transmitting has transmitted the first permission packet to the second communication terminal; and fourth transmitting, in a case where the third transmitting device has transmitted the first permission packet to the second communication terminal, to the third communication terminal a first notification packet that notifies that establishment of communication with the second communication terminal is permitted; and wherein the third communication terminal comprises:

a third processor; and a third memory storing computer-readable instructions, the instructions, when executed by the third processor, perform processes comprising:

fourth receiving the first notification packet transmitted from the first communication terminal;

fifth transmitting the second request packet to the second communication terminal in a case where the fourth receiving has received the first notification packet from the first communication terminal;

fifth receiving the second permission packet from the second communication terminal, after the fifth transmitting has transmitted the second request packet to the second communication terminal; and fourth communication with the second communication terminal in a case where the fifth receiving has received the second permission packet from the second communication terminal.

2. The communication system according to claim 1, wherein the third transmitting includes transmitting to the second communication terminal the first permission packet that is associated with predetermined key information;

the fourth transmitting includes transmitting to the third communication terminal the first notification packet that is associated with the key information;

the fifth transmitting includes transmitting to the second communication terminal the second request packet that is associated with the key information associated with the first notification packet received from the first communication terminal; and the second communicating includes communicating with the third communication terminal in a case where the key information that is associated with the first permission packet received from the first communication terminal by the first receiving matches the key information that is associated with the second request packet received from the third communication terminal by the second receiving.

3. The communication system according to claim 1, wherein the instructions stored in the second memory of the first communication terminal further perform a process comprising:

first determining, in a case where the third receiving has received the first request packet from the second communication terminal, whether to permit establishment of communication with the second communication terminal based on information that is input by a user or that is stored beforehand, and in a case where it is determined by the first determining that establishment of communication with the second communication terminal is permitted, the third transmitting includes transmitting the first permission packet to the second communication terminal, and the fourth transmitting includes transmitting the first notification packet to the third communication terminal.

4. The communication system according to claim 1, wherein the third transmitting includes transmitting to the second communication terminal the first permission packet that is associated with identification information of the third communication terminal, the instructions stored in the first memory of the second communication terminal further perform processes comprising:

second determining, in a case where the first receiving has received the first permission packet from the first communication terminal, whether to permit establishment of communication with the third communication terminal based on information that is input by a user after notifying the user of the identification information or that is stored beforehand; and sixth transmitting, in a case where it is determined by the second determining that establishment of communication with the third communication terminal is not permitted, to the first communication terminal a stop packet that stops establishment of communication;

the instructions stored in the second memory of the first communication terminal further perform a process comprising:

sixth receiving the stop packet transmitted from the second communication terminal, and wherein the fourth transmitting includes not transmitting the first notification packet to the third communication terminal in a case where the sixth receiving has received the stop packet from the second communication terminal.

5. The communication system according to claim 1, wherein the fourth transmitting includes transmitting, to the third communication terminal the first notification packet that is associated with identification information of the second communication terminal, the instructions stored in the third memory of the third communication terminal further perform processes comprising:

third determining, in a case where the fourth receiving has received the first notification packet from the first communication terminal, whether to permit establishment of communication with the second communication terminal based on information that is input by a user after notifying the user of the identification information or that is stored beforehand; and seventh transmitting, in a case where it is determined by the third determining that communication with the second communication terminal is not to be established, to the first communication terminal a rejection packet that rejects establishment of communication; and the instructions stored in the second memory of the first communication terminal further perform processes comprising:

seventh receiving the rejection packet transmitted from the third communication terminal; and prohibiting communication with the second communication terminal and cancelling establishment of communication in a case where the seventh receiving has received the rejection packet from the third communication terminal.

6. The communication system according to claim 1, further comprising:

a session initiation protocol (SIP) server that is connectable to the network and that performs call control between the first communication terminal, the second communication terminal and the third communication terminal, using an SIP, wherein the first communication terminal transmits the first permission packet to the second communication terminal via the SIP server, and transmits the first notification packet to the third communication terminal via the SIP server;

the second communication terminal transmits the first request packet to the first communication terminal via the SIP server, and transmits the second permission packet to the third communication terminal via the SIP server; and the third communication terminal transmits the second request packet to the second communication terminal via the SIP server.

7. The communication system according to claim 1, wherein the instructions stored in the third memory of the third communication terminal further perform processes comprising:

eighth transmitting a second notification packet to the second communication terminal;

eighth receiving one of a third request packet and a third notification packet from the second communication terminal; and storing identification information of the second communication terminal in a table, in a case where the fifth transmitting has transmitted the second request packet to the second communication terminal, in a case where the eighth transmitting has transmitted the second notification packet to the second communication terminal, and in a case where the eighth receiving has received one of the third request packet and the third notification packet from the second communication terminal; and wherein the fifth transmitting includes transmitting the second request packet to the second communication terminal in a case where the identification information of the second communication terminal is not stored in the table.

8. A communication system comprising:

a first communication terminal that is connectable to a network;

a second communication terminal that is connectable to the network and that has not established communication with the first communication terminal; and a third communication terminal that is connectable to the network and that has established communication with the first communication terminal; wherein the first communication terminal comprises:

a first processor: and a first memory storing computer-readable instructions, the instructions, when executed by the first processor, perform processes comprising:

first transmitting to the second communication terminal a first request packet that requests establishment of communication;

first receiving, after the first transmitting has transmitted the first request packet, from the second communication terminal a first permission packet that permits establishment of communication;

first communicating with the second communication terminal, in a case where the first receiving has received the first permission packet from the second communication terminal; and second transmitting, after the first receiving has received the first permission packet from the second communication terminal, to the third communication terminal a first notification packet that notifies that establishment of communication with the second communication terminal is permitted;

the second communication terminal comprises:

a second processor; and a second memory storing computer-readable instructions, the instructions, when executed by the second processor, perform processes comprising:

second receiving the first request packet from the first communication terminal;

third transmitting the first permission packet to the first communication terminal in a case where the second receiving has received the first request packet from the first communication terminal;

second communicating with the first communication terminal after the third transmitting has transmitted the first permission packet to the first communication terminal;

third receiving a second request packet from the third communication terminal, after the third transmitting has transmitted the first permission packet to the first communication terminal;

fourth transmitting a second permission packet to the third communication terminal in a case where the third receiving has received the second request packet from the third communication terminal; and third communicating with the third communication terminal, after the fourth transmitting has transmitted the second permission packet to the third communication terminal; and the third communicating terminal comprises:

a third processor; and a third memory storing computer-readable instructions, the instructions, when executed by the third processor, perform processes comprising:
fourth receiving the first notification packet transmitted from the first communication terminal;
fifth transmitting the second request packet to the second communication terminal in a case where the fourth receiving has received the first notification packet from the first communication terminal;
fifth receiving the second permission packet from the second communication terminal, after the fifth transmitting has transmitted the second request packet to the second communication terminal; and
fourth communication with the second communication terminal, in a case where the fifth receiving has received the second permission packet from the second communication terminal.

9. The communication system according to claim 8, wherein
the first transmitting includes transmitting to the second communication terminal the first request packet that is associated with predetermined key information;
the second transmitting includes transmitting to the third communication terminal the first notification packet that is associated with the key information;
the fifth transmitting includes transmitting to the second communication terminal the second request packet that is associated with the key information associated with the first notification packet received from the first communication terminal; and
the third communication includes communicating with the third communication terminal in a case where the key information that is associated with the first request packet received from the first communication terminal by the second receiving matches the key information that is associated with the second request packet received from the third communication terminal by the third receiving.

10. The communication system according to claim 8, wherein
the instructions stored in the second memory of the second communication terminal further perform a process comprising:
first determining, in a case where the second receiving has received the first request packet from the first communication terminal, whether to permit establishment of communication with the first communication terminal based on information that is input by a user or that is stored beforehand, and wherein
the third transmitting includes transmitting the first permission packet to the first communication terminal in a case where it is determined by the first determining that establishment of communication with the first communication terminal is permitted.

11. The communication system according to claim 8, wherein
the second transmitting includes transmitting to the third communication terminal the first notification packet that is associated with identification information of the second communication terminal,
the instructions stored in the third memory of the third communication. terminal further perform processes comprising:
second determining, in a case where the fourth receiving has received the first notification packet from the first communication terminal, whether to permit establishment of communication with the second communication terminal based on information that is input by a user after notifying the user of the identification information or that is stored beforehand; and
sixth transmitting, in a case where it is determined by the second determining that establishment of communication with the second communication terminal is not permitted, to the first communication terminal a rejection packet that rejects establishment of communication; and
the instructions stored in the first memory of the first communication terminal further perform processes comprising:
sixth receiving the rejection packet transmitted from the third communication terminal; and
prohibiting communication with the second communication terminal and cancelling establishment of communication in a case where the sixth receiving has received the rejection packet from the third communication terminal.

12. The communication system according to claim 8, further comprising
a session initiation protocol (SIP) server that is connectable to the network and that performs call control between the first communication terminal, the second communication terminal and the third communication terminal, using an SIP, wherein
the first communication terminal transmits the first request packet to the second communication terminal via the SIP server, and transmits the first notification packet to the third communication terminal via the SIP server,
the second communication terminal transmits the first permission packet to the first communication terminal via the SIP server, and transmits the second permission packet to the third communication terminal via the SIP server, and
the third communication terminal transmits the second request packet to the second communication terminal via the SIP server.

13. The communication system according to claim 8, wherein
the instructions stored in the third memory of the third communication terminal further perform processes comprising:
seventh transmitting a third request packet to the second communication terminal;
seventh receiving one of a fourth request packet and a second notification packet from the second communication terminal; and
storing identification information of the second communication terminal in a table, in a case where the fifth transmitting has transmitted the second request packet to the second communication terminal, in a case where the seventh transmitting has transmitted the third request packet to the second communication terminal, and in a case where the seventh receiving has received one of the fourth request packet and the second notification packet from the second communication terminal; and wherein
the fifth transmitting includes transmitting the second request packet to the second communication terminal in a case where the identification information of the second communication terminal is not stored in the table.

14. A non-transitory computer-readable medium storing computer-readable instructions, the instructions, when executed by a processor of a communication terminal, preform processes comprising:

first transmitting to a first communication terminal a first request packet that requests establishment of communication, the first communication terminal being another communication terminal with which the communication terminal has not established communication;

first receiving from the first communication terminal a first permission packet that permits establishment of communication, after the first request packet has been transmitted;

first communicating with the first communication terminal in a case where the first permission packet has been received from the first communication terminal;

second receiving, after the first permission packet has been received from the first communication terminal, a second request packet transmitted from a second communication terminal, the second communication terminal being still another communication terminal in which communication with the first communication terminal has been established;

second transmitting a second permission packet to the second communication terminal in a case where the second request packet has been received from the second communication terminal;

second communicating with the second communication terminal, after the second permission packet has been transmitted to the second communication terminal; and third transmitting, after the first permission packet has been received from the first communication terminal, a notification packet that notifies that communication with the first communication terminal is permitted to a third communication terminal, the third communication terminal being another of the communication terminals other than the first communication terminal and with which communication has been established.

15. The communication system according to claim 14, wherein
the second communicating includes communicating with the second communication terminal in a case where key information that is associated with the first permission packet received from the first communication terminal by the first receiving matches key information that is associated with a second request packet received from the second communication terminal by the second receiving.

16. The communication system according to claim 14, wherein
the instructions further perform processes comprising:
determining, in a case where the first receiving has received the first permission packet from the first communication terminal, whether to permit establishment of communication with the second communication terminal based on information that is input by a user after notifying the user of identification information of the second communication terminal or that is stored beforehand, the identification information being associatecd with the first permission packet;
fourth transmitting, in a case where it is determined by the determining that establishment of communication with the second communication terminal is not permitted, to the first communication terminal a stop packet that stops establishment of communication.

\* \* \* \* \*